US010918238B2

(12) United States Patent
Bhutani et al.

(10) Patent No.: US 10,918,238 B2
(45) Date of Patent: Feb. 16, 2021

(54) MODULAR MICRO DOSING DISPENSING SYSTEM

(71) Applicant: PEPSICO, INC., Purchase, NY (US)

(72) Inventors: Gurmeet Bhutani, Haryana (IN); Rahul Sadashiv Kamble, Maharashtra (IN); Tanmaya Vats, Haryana (IN)

(73) Assignee: PepsiCo, Inc., Purchase, NY (US)

( * ) Notice: Subject to any disclaimer, the term of this patent is extended or adjusted under 35 U.S.C. 154(b) by 310 days.

(21) Appl. No.: 15/761,743

(22) PCT Filed: Sep. 13, 2016

(86) PCT No.: PCT/US2016/051526
§ 371 (c)(1),
(2) Date: Mar. 20, 2018

(87) PCT Pub. No.: WO2017/053132
PCT Pub. Date: Mar. 30, 2017

(65) Prior Publication Data
US 2019/0059633 A1 Feb. 28, 2019

(30) Foreign Application Priority Data
Sep. 22, 2015 (IN) .......................... 3002/DEL/2015

(51) Int. Cl.
*A47J 31/40* (2006.01)
*B67D 1/00* (2006.01)
(Continued)

(52) U.S. Cl.
CPC ........... *A47J 31/404* (2013.01); *A47J 31/401* (2013.01); *A47J 31/402* (2013.01); *B67D 1/004* (2013.01);
(Continued)

(58) Field of Classification Search
CPC ...... A47J 31/404; A47J 31/401; A47J 31/402; B67D 1/004; B67D 1/0068; B67D 1/0864;
(Continued)

(56) References Cited

U.S. PATENT DOCUMENTS 4,211,342 A * 7/1980 Jamgochian ......... B67D 1/0036
222/129.4
5,975,365 A 11/1999 Hsieh
(Continued)

FOREIGN PATENT DOCUMENTS

WO WO 2013/164779 A1 7/2013

OTHER PUBLICATIONS

International Search Report of International Application No. PCT/US2016/051526 dated Jan. 24, 2017, 4 pages.

*Primary Examiner* — Bayan Salone
(74) *Attorney, Agent, or Firm* — Sterne, Kessler, Goldstein & Fox P.L.L.C.

(57) ABSTRACT

The disclosure concerns a system including a modular dispensing system comprising a first module comprising a cold engine assembly, and a second module comprising a hot engine assembly. The system comprises a carbonator configured to dissolve carbon dioxide in water to form carbonated water. The cold engine assembly comprises a cold bath. A cold liquid mixer is configured to mix a concentrate and the carbonated water to form a cold ready-to-drink liquid. The hot engine assembly comprises a hot tank. A hot liquid mixer is configured to mix the hot water from the hot tank and a powder to form a hot ready-to-drink liquid. In an aspect, the cold engine assembly and the hot engine assembly form a single dispensing unit.

21 Claims, 22 Drawing Sheets

(51) Int. Cl.
 *B67D 1/08* (2006.01)
 *B67D 1/07* (2006.01)
(52) U.S. Cl.
 CPC ......... *B67D 1/0021* (2013.01); *B67D 1/0068* (2013.01); *B67D 1/0864* (2013.01); *B67D 1/0895* (2013.01); *B67D 2001/075* (2013.01); *B67D 2210/00034* (2013.01)
(58) Field of Classification Search
 CPC ................ B67D 1/0895; B67D 1/0021; B67D 2210/00034; B67D 2001/075
 See application file for complete search history.

(56) References Cited

U.S. PATENT DOCUMENTS

| | | | |
|---|---|---|---|
| 8,985,396 B2* | 3/2015 | Jersey | B67D 1/0041 222/129.1 |
| 9,346,659 B2* | 5/2016 | Brown | B67D 1/0021 |
| 2005/0230421 A1 | 10/2005 | Morrow, Sr. et al. | |
| 2012/0298692 A1* | 11/2012 | Jersey | B67D 1/0021 222/129.1 |
| 2013/0231774 A1 | 9/2013 | Tilton et al. | |
| 2014/0305316 A1* | 10/2014 | Sevcik | B67D 1/0877 99/323.2 |
| 2015/0069087 A1* | 3/2015 | Brown | A47J 31/41 222/129.1 |

\* cited by examiner

MODULAR MICRO DOSING DISPENSING SYSTEM

FIELD OF THE INVENTION

This disclosure relates generally to a method and modular system for dispensing free-flowing food products, e.g., for restaurants (including fast food restaurants), theatres, convenience stores, gas stations, and other entertainment and/or food service venues.

BACKGROUND

Various beverage dispensers, such as those at restaurants, theatres and other entertainment and/or food service venues, typically have either a "drop in" dispenser apparatus or a counter top type dispenser apparatus. In a drop in dispenser apparatus, the dispenser apparatus is self-contained and may be dropped into an aperture of a counter top. In a counter top type dispenser apparatus, the dispenser apparatus is placed on a counter top. In conventional beverage dispensers, a dispensing head is coupled to a particular drink syrup supply source via a single pipe dedicated to supply the particular drink syrup to that dispensing head.

A user will typically place a cup under the signage of the selected beverage and either press a button or press the cup against a dispensing lever to activate the dispenser so that the selected beverage is delivered from the dispensing head corresponding to the selected beverage and into the cup until pressure is withdrawn from the button or lever.

Free-flowing food products comprise a range of product formats. Some free-flowing food products or beverages are formed from powders, and other free-flowing food products or beverages are formed from concentrates. Some free-flowing food products are non-carbonated beverages (NCBs), and other free-flowing food products are carbonated soft drinks (CSDs). Some free-flowing food products need to be dispensed as cold ready-to-drink (RTD) products, and other free-flowing food products need to be dispensed as hot or warm ready-to-drink (RTD) products. Conventional dispensers are not configured to dispense a full range of free-flowing food products of the above product formats.

What is needed is a free-flowing food product dispensing system that does not have the limitations and disadvantages of conventional beverage dispensers and methods.

SUMMARY

Accordingly, in an aspect of the disclosure, there is provided a modular dispensing system comprising a cold engine assembly and a hot engine assembly. In an aspect, the cold engine assembly comprises a cold bath configured to cool a liquid from an initial temperature to a desired lower temperature, a carbonator configured to dissolve carbon dioxide in water to form carbonated water, and a cold liquid mixer. In an aspect, the cold engine assembly comprises a concentrate line configured to convey a concentrate through the cold bath and to the cold liquid mixer, and a cold water line configured to convey water through the cold bath to the cold liquid mixer. The cold liquid mixer is configured to mix the concentrate and carbonated water that had been cooled in the cold bath to form a cold carbonated concentrate based ready-to-drink liquid.

In an aspect, the hot engine assembly comprises a hot tank configured to heat water from an initial temperature to a desired elevated temperature, a hot liquid mixer, the hot engine assembly comprising a powder line configured to convey a powder to the hot liquid mixer, the hot liquid mixer configured to mix the powder and the water from the hot tank having the desired elevated temperature to form a hot non-carbonated powder based ready-to-drink liquid.

In an aspect, the modular dispensing system comprises a cold liquid dispensing nozzle configured to dispense the cold ready-to-drink liquid, and a hot liquid dispensing outlet configured to dispense the hot ready-to-drink liquid. In an aspect, the cold engine assembly and the hot engine assembly form a single dispensing unit having a single dispensing station, the single dispensing station comprising the cold liquid dispensing nozzle and the hot liquid dispensing outlet.

In accordance with an aspect of the disclosure, a hot engine retrofit assembly is provided. The hot engine retrofit assembly comprises a hot tank and a hot liquid mixer. The hot engine retrofit assembly is configured to heat water to a desired temperature, for example, in the range of about 80 to 95 degrees Centigrade. The hot engine retrofit assembly is configured to convey hot water from the hot tank to the hot liquid mixer. The hot engine retrofit assembly is configured to convey a powder to the hot liquid mixer. The hot liquid mixer is configured to mix the hot water from the hot tank and the powder to form a hot ready-to-drink liquid. The hot engine retrofit assembly is configured to be located on top of a cold drink dispensing assembly comprising a cold drink dispensing nozzle, wherein the cold drink dispensing assembly is located at or on top of a counter. The hot engine retrofit assembly comprises a hot liquid dispensing outlet. The hot liquid dispensing outlet is configured to dispense the hot ready-to-drink liquid, wherein the hot liquid dispensing outlet is at substantially the same height as the cold drink dispensing nozzle.

The above and other aspects, features and advantages of the present disclosure will be apparent from the following detailed description of the illustrated embodiments thereof which are to be read in connection with the accompanying drawings.

Figure 1:
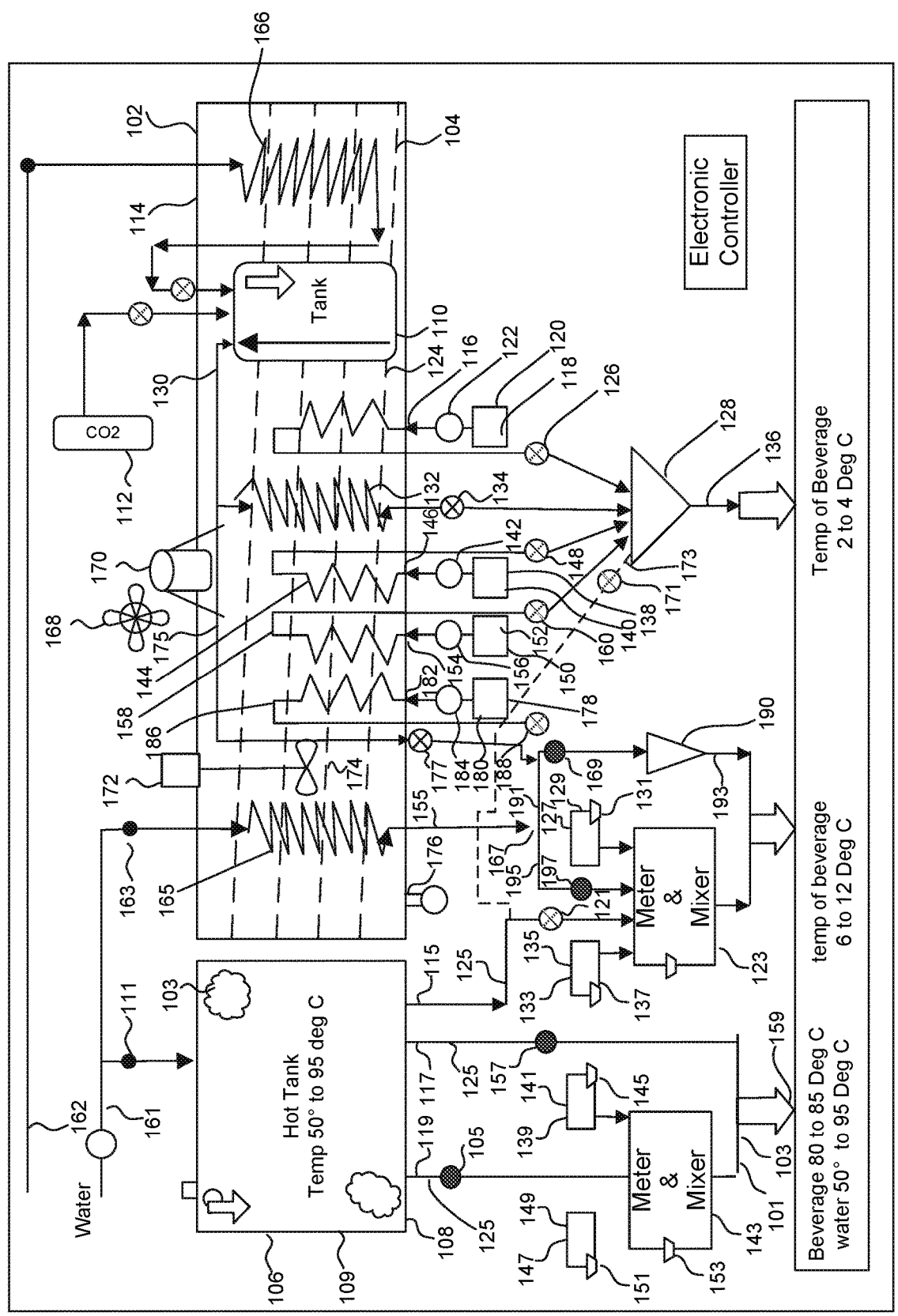
FIG. 1 is a flow diagram of an embodiment of a modular dispensing system according to various aspects of the disclosure.

DETAILED DESCRIPTION OF THE
PREFERRED EMBODIMENTS

The embodiments discussed below may be used to form a wide variety of beverages, including but not limited to cold and hot beverages, and including but not limited to beverages known under any PepsiCo branded name, such as Pepsi-Cola®.

Accordingly, in an aspect of the disclosure, there is provided a modular dispensing system comprising a cold engine assembly and a hot engine assembly. In an aspect, the modular dispensing system may comprise a carbonator configured to dissolve carbon dioxide in water to form carbonated water. The carbonator may comprise a carbonation tank. The cold engine assembly may comprise a cold bath. The cold bath may be configured to cool liquids to a desired temperature. The cold engine assembly may comprise a first concentrate line configured to receive a first concentrate and convey the first concentrate through the cold bath. The first concentrate line may be configured to convey the first concentrate from the first concentrate inlet, through the ice bath, and to a first concentrate valve. The first concentrate valve may be configured to convey the first concentrate to a cold liquid mixer. The cold engine assembly may comprise a carbonated water line that is configured to convey carbonated water from the carbonation tank, through the cold bath, and through a carbonated water valve. The carbonated water valve may be configured to convey the carbonated water to the cold liquid mixer. The cold water mixer may be configured to mix the first concentrate and the carbonated water to form a first cold ready-to-drink liquid. The modular dispensing system may comprise a dispensing nozzle. The dispensing nozzle may be configured to receive the first cold ready-to-drink liquid from the cold water mixer, and dispense the first cold ready-to-drink liquid from the modular dispensing system through the dispensing nozzle.

The hot engine assembly of the modular dispensing system comprises a hot tank. The hot tank may be configured to heat water to a desired temperature, for example, in the range of about 80 to 95 degrees Centigrade. The hot engine assembly may be configured to convey hot water from the hot tank to a hot liquid mixer. The hot engine assembly may be configured to convey a powder to the hot liquid mixer. The hot liquid mixer may be configured to mix the hot water from the hot tank and the powder to form a first hot ready-to-drink liquid. The modular dispensing system may be configured to dispense the first hot ready-to-drink liquid from the hot liquid mixer through a hot drink outlet. In an aspect, the modular dispensing system is suitable for placement at or on top of a counter. In an aspect, the hot liquid dispensing outlet is configured to dispense the first hot ready-to-drink liquid, wherein the hot liquid dispensing outlet is at substantially the same height as the cold drink dispensing nozzle. In an aspect, the cold engine assembly and the hot engine assembly comprise a single dispensing unit. The single dispensing unit may comprise a single dispensing station. The single dispensing station may comprise a cold drink dispensing outlet, and at least one hot liquid dispensing outlet.

Referring to FIG. 1, the description of one embodiment of the modular dispensing system of the present disclosure will be described. In an aspect, the modular dispensing system is suitable for placement at or on top of a counter. As shown in FIG. 1, modular dispensing system 100 may be provided comprising first module 102 comprising cold engine assembly 104, and second module 106 comprising hot engine assembly 108. Modular dispensing system 100 comprises carbonation tank 110. Carbonation tank 110 may be configured to dissolve carbon dioxide in water to form carbonated water. Carbonation tank 110 may be configured to receive carbon dioxide from a carbon dioxide source 112, for example a pressurized carbon dioxide cylinder. Cold engine assembly 104 may comprise cold bath 114. Cold bath may be configured to cool liquids to a temperature in the range of about 2 to 4 degrees Centigrade. First module 102 may comprise first concentrate inlet 116. First concentrate inlet 116 may be configured to receive first concentrate 118. First concentrate 118 may be pumped from first concentrate source 120 through first concentrate inlet 116 by pump 122. First concentrate source 120 may be any suitable source, including but not limited to a "bag-in-box" container. First concentrate 118 may be conveyed through coil 124 and cooled by cold bath 114. After cooling, first concentrate 118 may conveyed through valve 126 to cold liquid mixer 128.

Carbonated water 130 formed in carbonation tank 110 may be conveyed through coil 132 and cooled by cold bath 114. After cooling, carbonated water 130 may be conveyed through valve 134 to cold liquid mixer 128. Cold liquid mixer 128 may be a dispensing nozzle. Cold liquid mixer 128 may be configured to mix a concentrate (for example, first concentrate 118), and water (for example, carbonated water 130) to form a ready-to-drink liquid 136. Carbonated water 130 may be conveyed through line 175 to line 191. Line 175 may comprise valve 177. Line 175 may comprise a coil (not shown) in cold bath 114, which may be similar to coil 132.

Other concentrates may be conveyed to cold liquid mixer 128. For example, as shown in FIG. 1, second concentrate 138 may be pumped from second concentrate source 140 through second concentrate inlet 146 by pump 142. Second concentrate source 140 may be any suitable source, including but not limited to a "bag-in-box" container. Second concentrate 138 may be conveyed through coil 144 and cooled by cold bath 114. After cooling, second concentrate 138 may conveyed through valve 148 to cold liquid mixer 128.

Third concentrate 150 may be pumped from third concentrate source 152 through second concentrate inlet 154 by pump 156. Third concentrate source 150 may be any suitable source, including but not limited to a "bag-in-box" container. Third concentrate 150 may be conveyed through coil 158 and cooled by cold bath 114. After cooling, third concentrate 150 may conveyed through valve 160 to cold liquid mixer 128. Those skilled in the art will recognize that in accordance with the disclosure, addition concentrates may be conveyed to cold liquid mixer 128.

First concentrate 118, second concentrate 138, and third concentrate 150 may be any suitable concentrate, e.g., a syrup concentrate corresponding to a soft drink. Water may be conveyed through line 162 by pump 164 and through coil 166 in cold engine assembly 104. Upon exiting coil 166, the water may be conveyed into carbonation tank 110. Water may be supplied to line 162 from any suitable source, for example, a municipality water source.

Module 102 may comprise condenser fan 168, compressor 170 and stirrer motor 172 for providing cooling medium 174 and stirring of cooling medium 174 in cold engine assembly 104. Cooling medium 174 may be any suitable cooling medium, e.g., chilled water or ice. Drain outlet 176 may be provided to allow for draining of cooling medium 174 when desired, e.g., to access and/or service the components in cold engine assembly 104.

Fourth concentrate 178 may be pumped from fourth concentrate source 180 through fourth concentrate inlet 182 by pump 184. Fourth concentrate 178 may be any suitable source, including but not limited to a "bag-in-box" container. Fourth concentrate 178 may be any suitable concentrate, e.g., a syrup concentrate corresponding to a soft drink Fourth concentrate 178 may be conveyed through coil 186 and cooled by cold bath 114. After cooling, fourth concentrate 178 may conveyed through valve 188 to mixer 190. Those skilled in the art will recognize that in accordance with the disclosure, addition concentrates may be conveyed to mixer 190.

As shown in FIG. 1, water may be supplied through line 161 through solenoid valve 163 and through coil 165 in cold engine assembly 104. Upon exiting coil 165, cooled or cold water 155 may be conveyed to juncture 167, through line 191, and to mixer 190. Line 191 may comprise solenoid valve 169. Water may be supplied to line 161 from any suitable source, for example, a municipality water source. Mixer 190 may be configured to mix a concentrate (for example, fourth concentrate 178), and cooled or cold water 155 to form a ready-to-drink liquid 193.

Hot engine assembly 108 of second module 106 may comprise hot tank 109. Hot tank 109 may be configured to raise the temperature of water, e.g., water supplied from line 161 through solenoid valve 111 to a desired temperature, e.g., about 90 to 95 degrees Centigrade. Hot engine assembly 108 may comprise heater 113. Heater 113 may be configured to heat the water in hot tank 109 to a desired temperature. After being heated to a desired temperature, the heated or hot water 125 may exit hot tank 109 through lines 115, 117, and 119. Line 115 may split into two lines, with one line comprising solenoid valve 121, and the other line comprising solenoid valve 171. Line 115 may convey heated or hot water 125 from hot tank 109 to mixer 123. Mixer 123 may be powered by a mixing motor.

Cooled or cold water 155 that exits coil 165 may be conveyed through juncture 167 and line 195 to mixer 123. Line 195 may comprise solenoid valve 197. First powder 127 may be conveyed from powder source 129 to mixer 123. Powder 127 may be conveyed by a meter 131, which may be powered by a metering motor.

Second powder 133 may be conveyed from powder source 135 to mixer 123. Second powder 133 may be conveyed by a meter 137, which may be powered by a metering motor. The motor that powers meter 131 and meter 137 may be the same motor. The motor that powers mixer 123 may be the same motor that powers meter 131 and/or meter 137.

First powder 127 and second powder 133 may be any suitable powder, e.g., a powder corresponding to a soft drink, such as a non-carbonated beverage. Those skilled in the art will recognize that in accordance with the disclosure, various ready-to-drink liquids may be prepared in mixer 123, including liquids prepared using either first powder 127 or second powder 133, or combinations thereof, and including drinks prepared using heated or hot water 125 or cooled or cold water 155 from coil 165. Thus, a variety of drinks may be prepared having a desired temperature. The desired temperature may be about 2 to 4 degrees Centigrade, e.g., by using cooled or cold water exiting coil 132, or may be about 80 to 95 degrees Centigrade, e.g., by using heated or hot water 125, or may be a temperature in between, such as about 6 to 12 degrees Centigrade, e.g., by using water 155 exiting coil 165, or may be some other temperature in between 2 degrees Centigrade and 95 degrees Centigrade, e.g., by using a combination of water 125, and water 155 exiting coil 165, and/or cold water exiting coil 132.

Third powder 139 may be conveyed from powder source 141 to mixer 143. Third powder 139 may be conveyed by a meter 145, which may be powered by a metering motor. Fourth powder 147 may be conveyed from powder source 149 to mixer 143. Fourth powder 147 may be conveyed by a meter 151, which may be powered by a metering motor. The motor that powers meter 145 and meter 151 may be the same motor. Motor 153 may power mixer 143. Motor 153 that powers mixer 143 may be the same motor and powers meter 145 and/or meter 151.

Line 117 may comprise solenoid valve 157. When heated or hot water is conveyed through line 117 to outlet 159, the water may be a desired temperature, e.g., about 90 to 95 degrees Centigrade. Line 119 may comprise solenoid valve 105. When heated or hot water is conveyed through line 119 and mixed with a powder, e.g., third powder 139 and/or fourth powder 147, in mixer 143 to form mixture 101, mixture 101 may have a desired temperature of about 80 to 85 degrees Centigrade. Mixture 101 may be conveyed through line 103 to outlet 159.

Those skilled in the art will recognize that various free flowing food products, such as ready-to-drink liquids, may be formed using modular dispensing system 100 described above and as shown in FIG. 1. The products formed using modular dispensing system 100 may be selected from the group consisting of (1) a carbonated beverage formed by mixing first concentrate 118 and carbonated water 130, (2) a carbonated beverage formed by mixing second concentrate 138 and carbonated water 130, (3) a carbonated beverage formed by mixing third concentrate 150 and carbonated water 130, (4) a non-carbonated ready-to-drink liquid 193 formed by mixing fourth concentrate 178 and water 155, (5) a beverage formed by mixing first powder 127 and water 155 and/or water 125, (6) a beverage formed by mixing second powder 133 and water 155 and/or water 125, (7) a beverage, e.g., coffee, formed by mixing third powder 139 and water 125, (8) a beverage, e.g., tea, formed by mixing fourth powder 147 and water 125, and (9) heated or hot water 125 alone from line 117.

In an aspect, the three (3) carbonated beverages identified in the preceding paragraph may be one of three different carbonated soft drinks, e.g., a cola, a carbonated lemon-lime drink, or some other carbonated soft drink, e.g., a carbonated fruit flavored soft drink. In an aspect, non-carbonated ready-to-drink liquid 193 may comprise a non-carbonated fruit flavored drink, such as an orange, lemon, or mixed fruit flavored drink.

In an aspect, the beverage formed by mixing first powder 127 and water 155 and/or water 125 may comprise a non-carbonated fruit flavored drink, such as an orange, lemon, or mixed fruit flavored drink, and/or a drink comprising glucose or other sweetener. The drink comprising glucose or other sweetener may further comprise a mineral salt and/or iron.

In an aspect, the beverage formed by mixing second powder 133 and water 155 and/or water 125 may comprise a non-carbonated tea (e.g., a cold or chilled tea) or a fruit flavored drink (e.g., an orange, lemon, or a mixed fruit flavored drink), and/or a drink comprising glucose or other sweetener. The drink comprising glucose or other sweetener may further comprise a mineral salt and/or iron.

While FIG. 1 depicts module 106 and module 102 in a horizontal side-by-side configuration, those skilled in the art will recognize that these modules may be configured with module 106 being placed on top of module 102, or module 102 being placed on top of module 106.

In an embodiment, hot water 125 generated in hot tank 109 may be used to sanitize of any fluid line and other equipment components in the system. For example, hot water 125 may be used to sanitize one or more lines configured to convey concentrates (118, 138, 150, and 178) and lines configured to convey mixtures of concentrates and water through the system. Hot water 125 may be used to sanitize lines from respective sources (120, 140, 152, and 180), one or more respective pumps (122, 142, 156, and 184), one or more respective inlets (116, 146, 154, and 182), one or more respective coils (124, 144, 158, and 186), one or more mixers (128, 190), one or more valves (126, 148, 160, and 188), and one or more dispensing nozzles (e.g., 128 and 190, when mixers 128 and 190 are dispensing nozzles). Hot water 125 may be conveyed from at least one of valves 105, 121, 157, or 171 through a sanitizing line to any of the above equipment components of the system. For example, but not by limitation, hot water 125 from hot tank 109 maybe conveyed through valve 171 through exemplary sanitizing line 173 to mixer 128. By providing hot water 125 from hot tank 109 through a sanitizing line (such as exemplary sanitizing line 173), equipment components of cold engine assembly 104 may be easily sanitized without the need for manual cleaning of equipment components, or otherwise obtaining hot water from outside modular dispensing system 100 for cleaning of components as in conventional dispensing systems.

Figure 2:
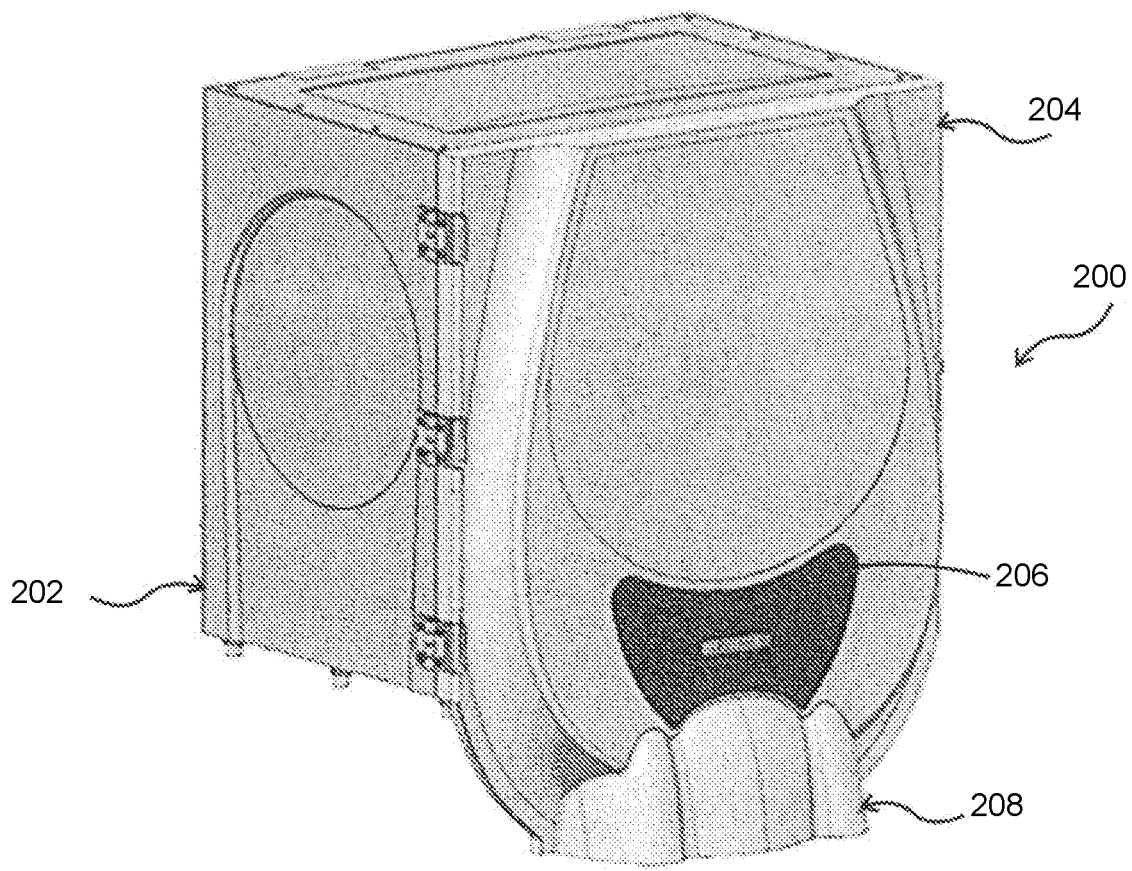
FIG. 2 illustrates an embodiment of a hot engine assembly according to various aspects of the disclosure.

FIG. 2 illustrates an embodiment of a module 200 according to various aspects of the disclosure. Module 200 may be the same or similar to module 106 shown in FIG. 1. Module 200 may comprise a hot engine assembly similar to hot engine assembly 108 in FIG. 1. Module 200 may comprise a housing 202. Housing 202 may comprise door 204. Module 200 may comprise user interface 206. Module 200 may comprise cover 208.

Figure 3:
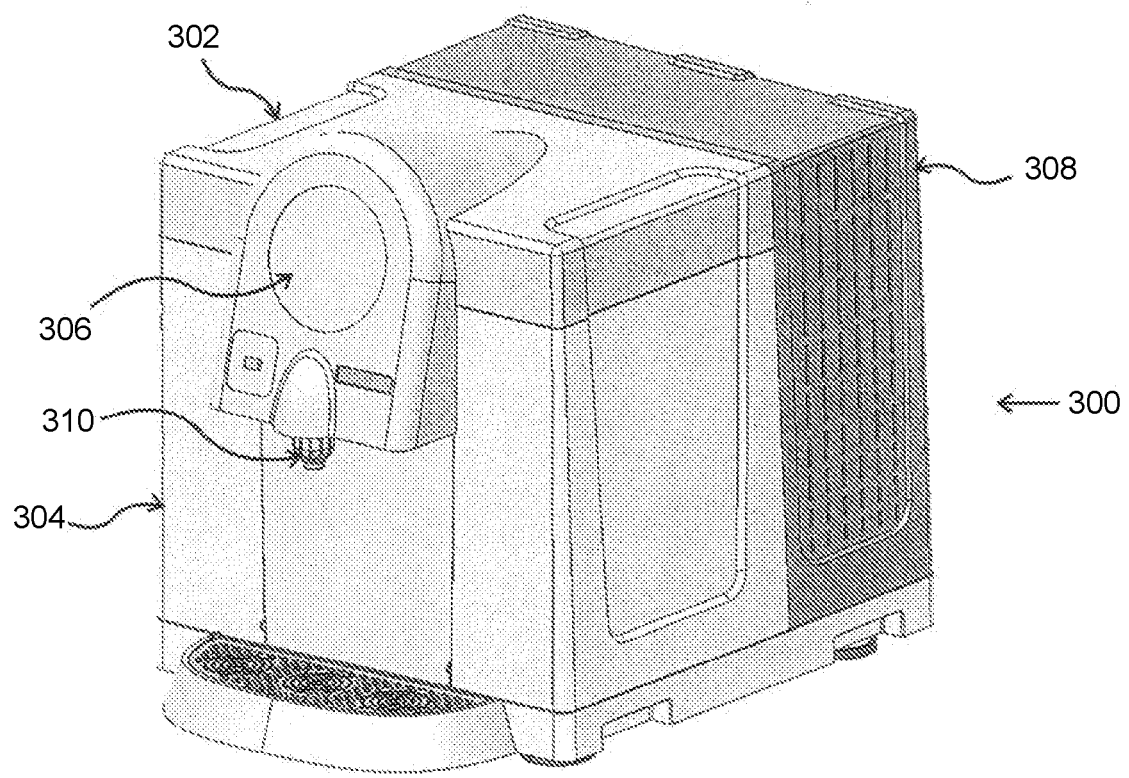
FIGS. 3, 4, 5, 6, and 7 collectively illustrate the combining of a dispensing system having a cold engine assembly with the hot engine assembly shown in FIG. 2.
Figure 5:
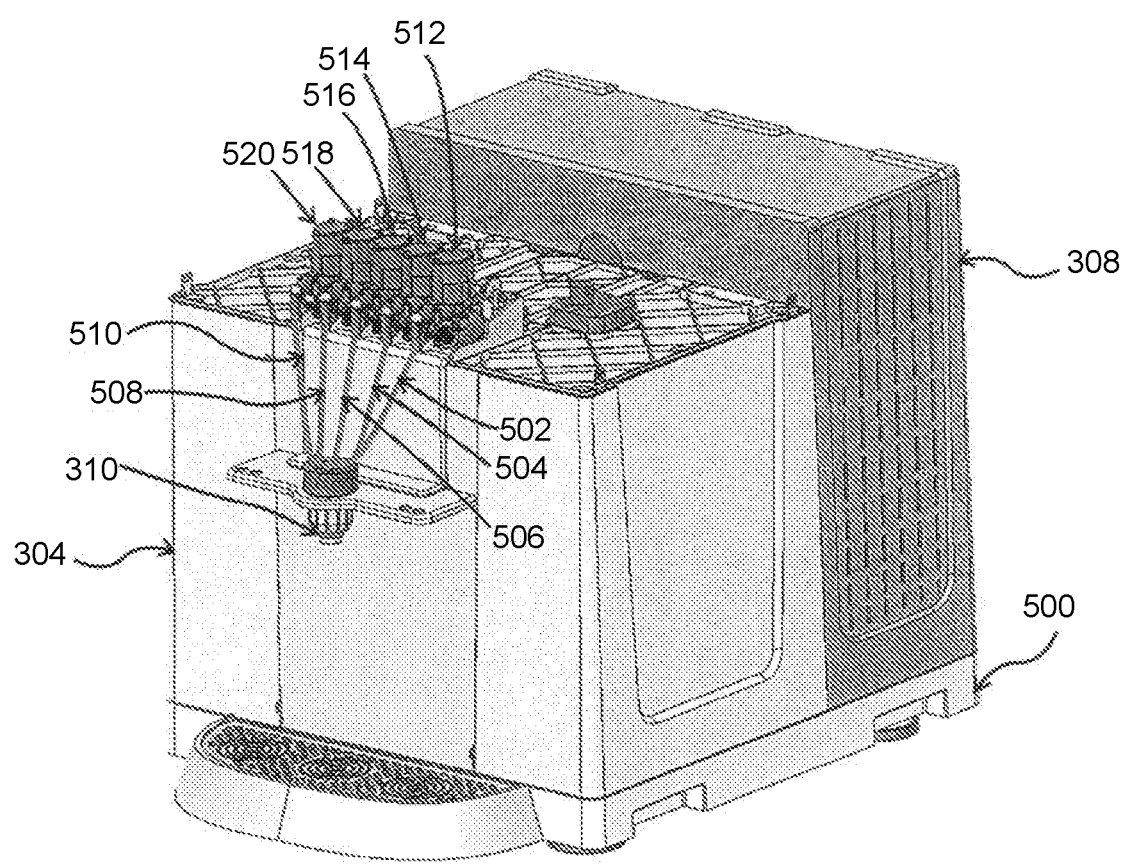
Figure 6:
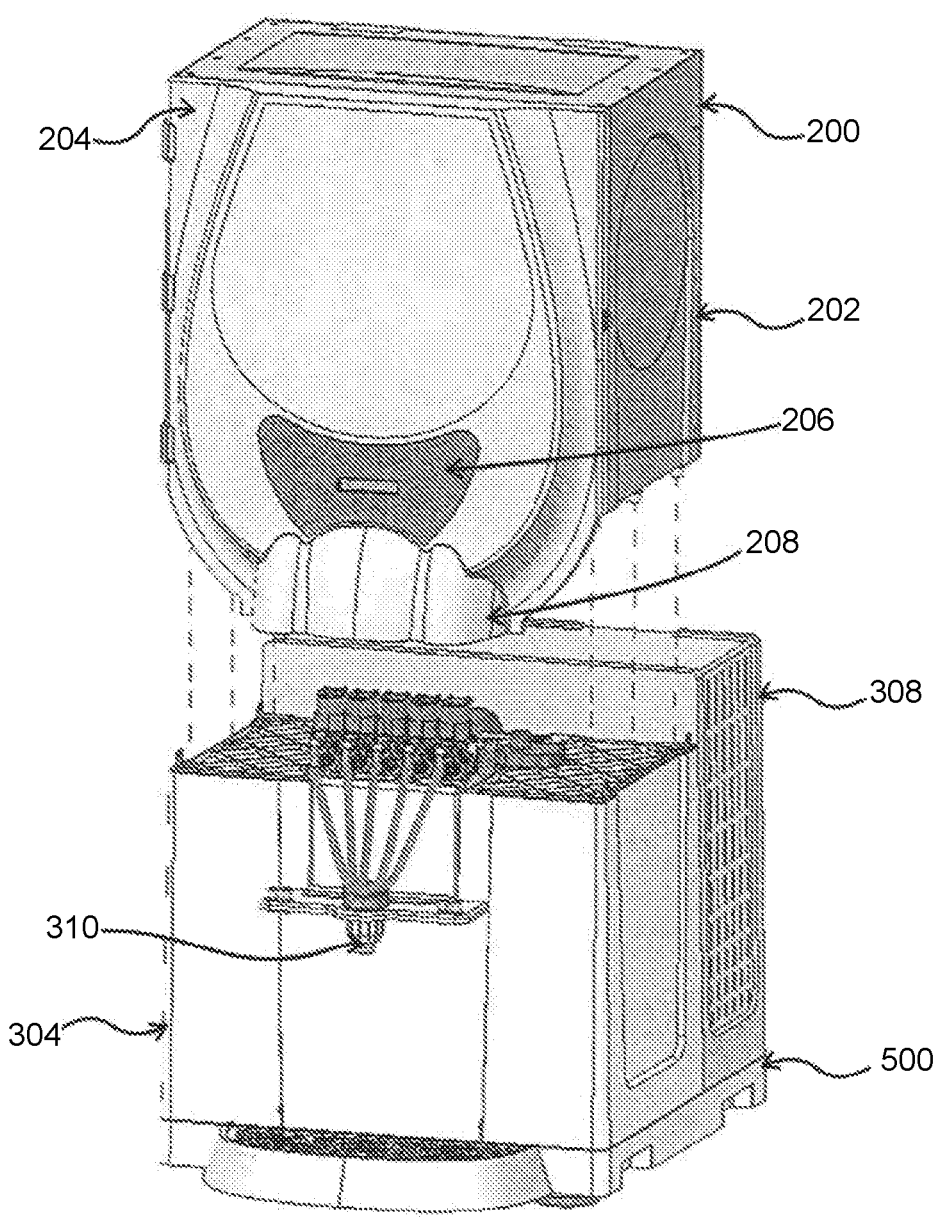
Figure 7:
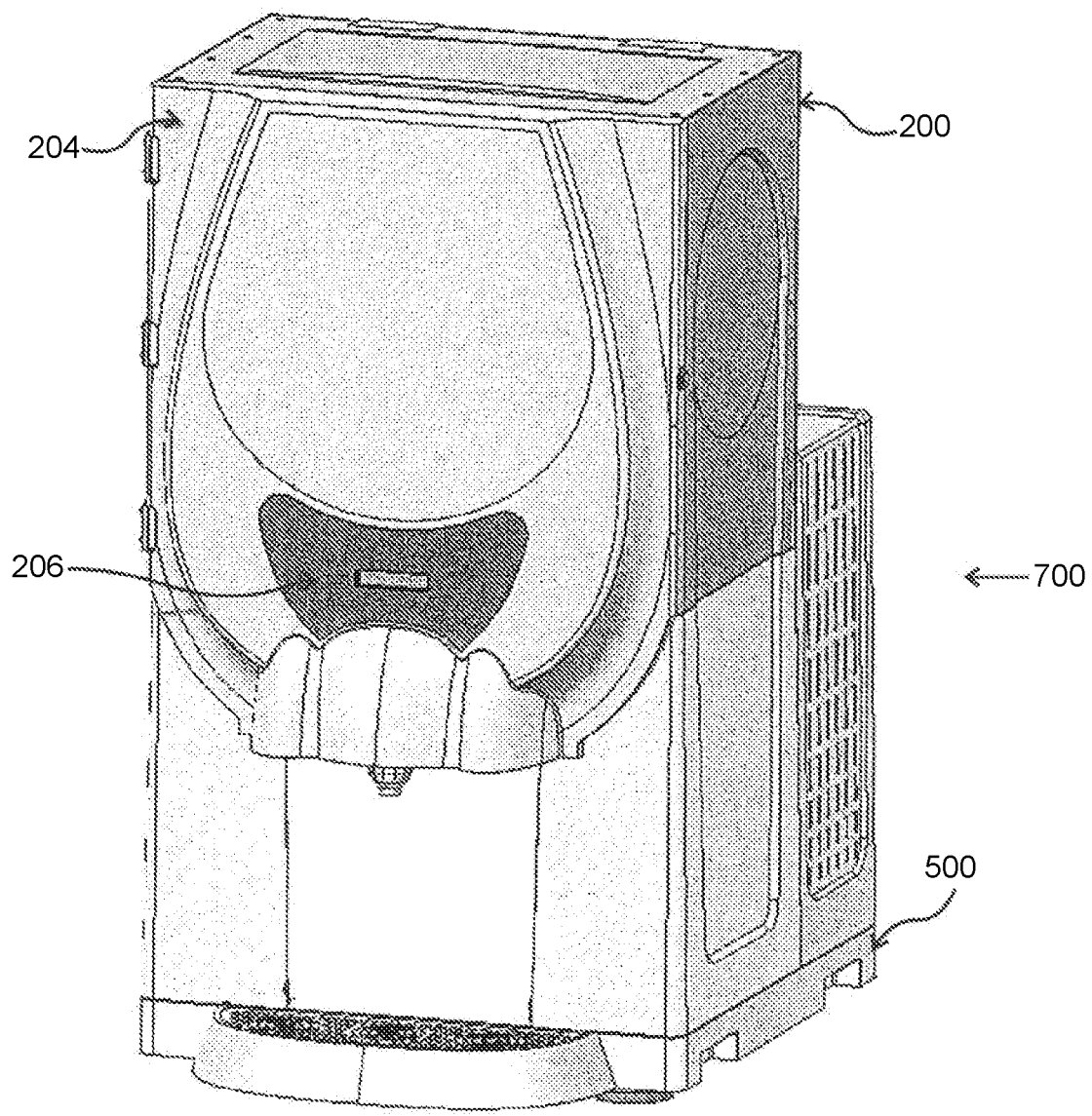

FIGS. 3, 4, 5, 6, and 7 collectively illustrate the combining of a module comprising a cold engine assembly with a module comprising a hot engine assembly to form modular dispensing system 700, shown in FIG. 7. Modular dispensing system 700 may be the same as or similar to modular dispensing system 100 described above and as shown in FIG. 1. Shown in FIG. 3 is a dispensing system 300 that is configured to dispense cold carbonated beverages. Dispensing system 300 may configured to dispense only cold beverages, such as cold carbonated soft drinks. Dispensing system 300 may comprise upper front portion 302, lower front portion 304, and back portion 308. Upper front portion 302 may comprise a user interface 306. User interface 306 may be configured to allow a user to push a button or use a touch screen to select a beverage to be dispensed by dispensing system 300. As shown in FIG. 3, dispensing system 300 may comprise dispensing nozzle 310. Dispensing nozzle 310 may be the same as or similar to cold liquid mixer 128 described above and shown in FIG. 1.

Figure 4:
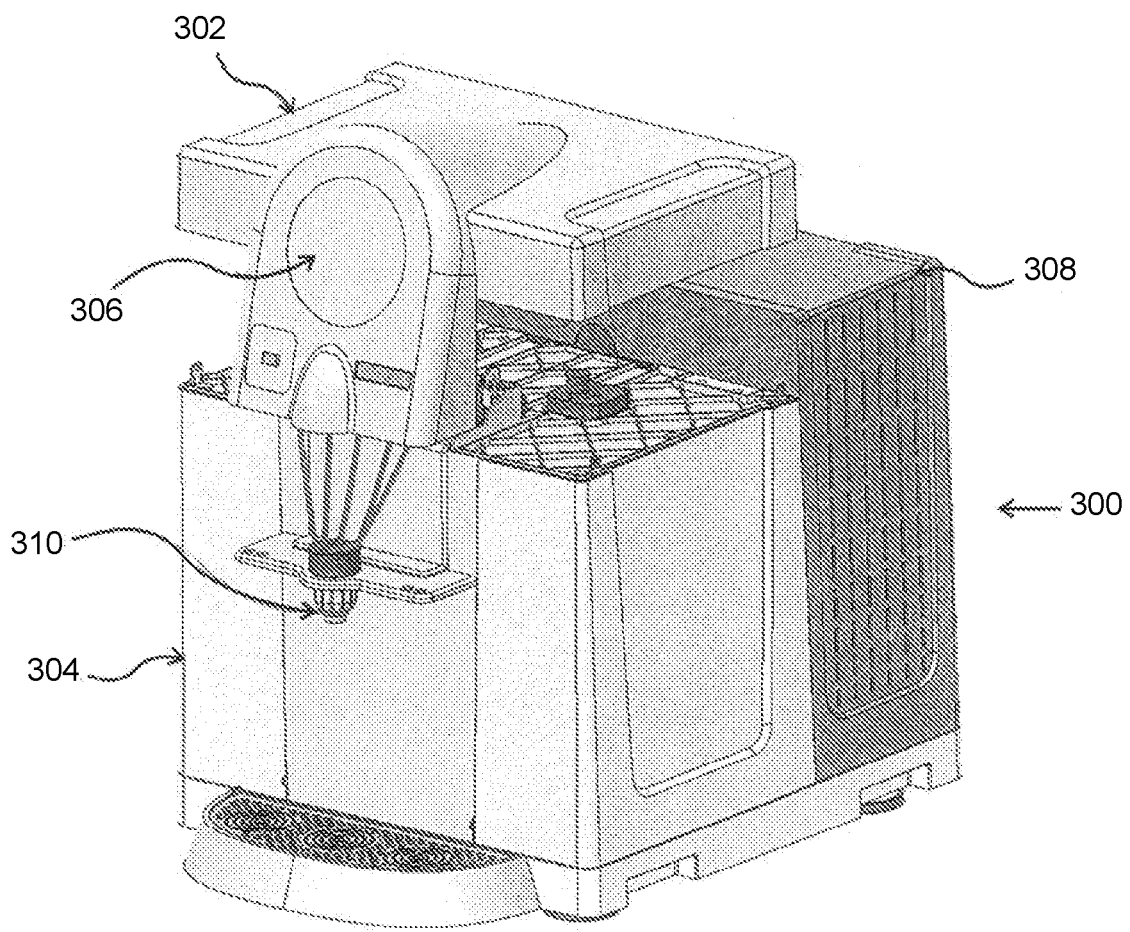

As shown in FIG. 4, upper front portion 302 may be removed from lower front portion 304 and back portion 308, resulting in module 500, shown in FIG. 5. Module 500 may be similar to module 102 described above and shown in FIG. 1. Module 500 is shown having lines 502, 504, 506, 508, and 510. Line 502 may be configured to a receive a first carbonated beverage formed by mixing a concentrate with carbonated water in mixer 512. Line 504 may be configured to a receive a second carbonated beverage formed by mixing a concentrate with carbonated water in mixer 514. Line 506 may be configured to a receive a third carbonated beverage formed by mixing a concentrate with carbonated water in mixer 516. Line 508 may be configured to a receive a fourth carbonated beverage formed by mixing a concentrate with carbonated water in mixer 518. Line 510 may be configured to a receive a fifth carbonated beverage formed by mixing a concentrate with carbonated water in mixer 520. In an alternative embodiment, line 508 may be configured to receive a cold non-carbonated beverage formed by mixing a concentrate with non-carbonated water in mixer 518. In an alternative embodiment, line 510 may be configured to receive only cold non-carbonated water from mixer 520.

FIG. 6 shows module 200 of FIG. 2 being combined with module 500 of FIG. 5, resulting in modular dispensing system 700 shown in FIG. 7. Modular dispensing system 700 may be the same as or similar to modular dispensing system 100 shown in FIG. 1.

Figure 8:
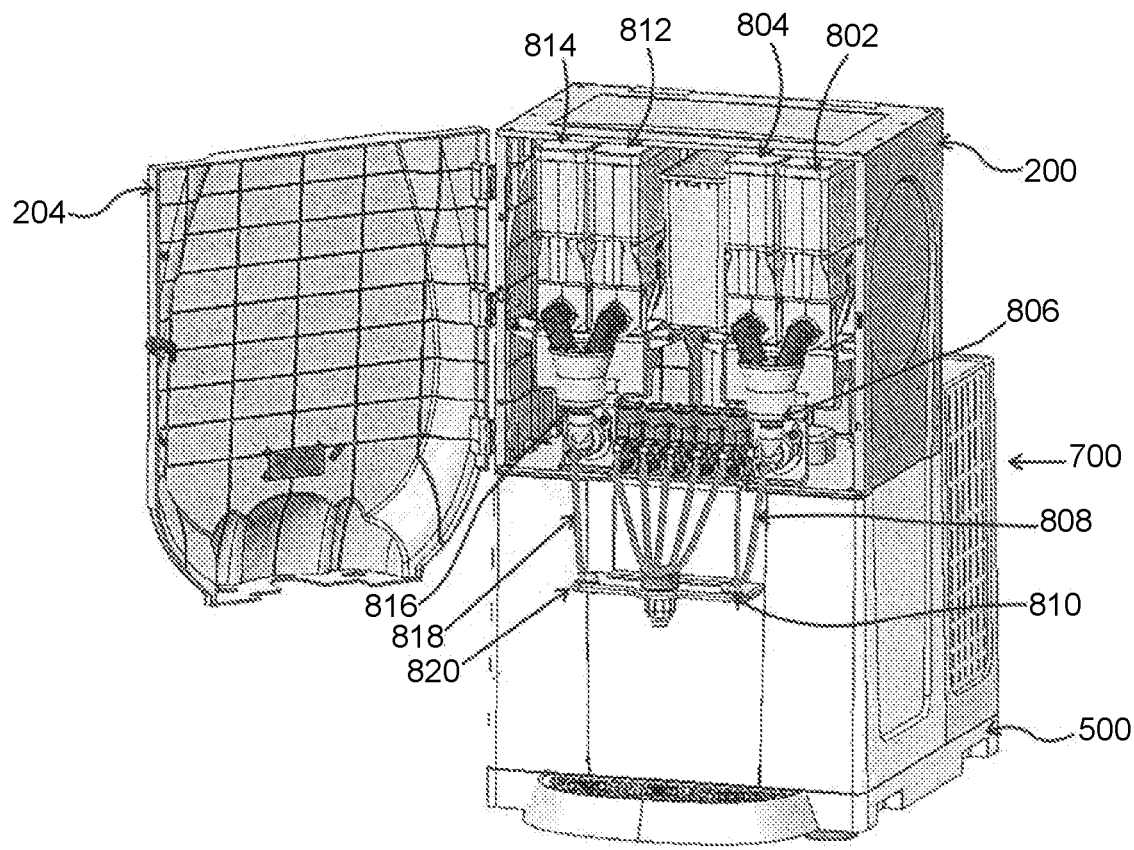
FIG. 8 illustrates the embodiment shown in FIG. 7, with a door of the hot engine assembly in the open position.

FIG. 8 shows modular dispensing system 700 with door 204 of module 200 in an open position. Powder source or container 802 may be configured to convey a first powder to mixer 806. Powder source or container 804 may be configured to convey a second powder to mixer 806. Mixer 806 may be similar to mixer 123 shown in FIG. 1. Mixer 806 may be configured to mix a powder with heated or hot water form a finished product for consumption by a consumer. Line 808 may be configured to convey a finished product from mixer 806 to outlet 810.

Powder source or container 812 may be configured to convey a third powder to mixer 816. Powder source or container 814 may be configured to convey a fourth powder to mixer 816. Mixer 816 may be similar to mixer 143 shown in FIG. 1. Mixer 816 may be configured to mix a powder with heated or hot water form a finished product for consumption by a consumer. Line 818 may be configured to convey a finished product from mixer 816 to outlet 820.

Figure 9:
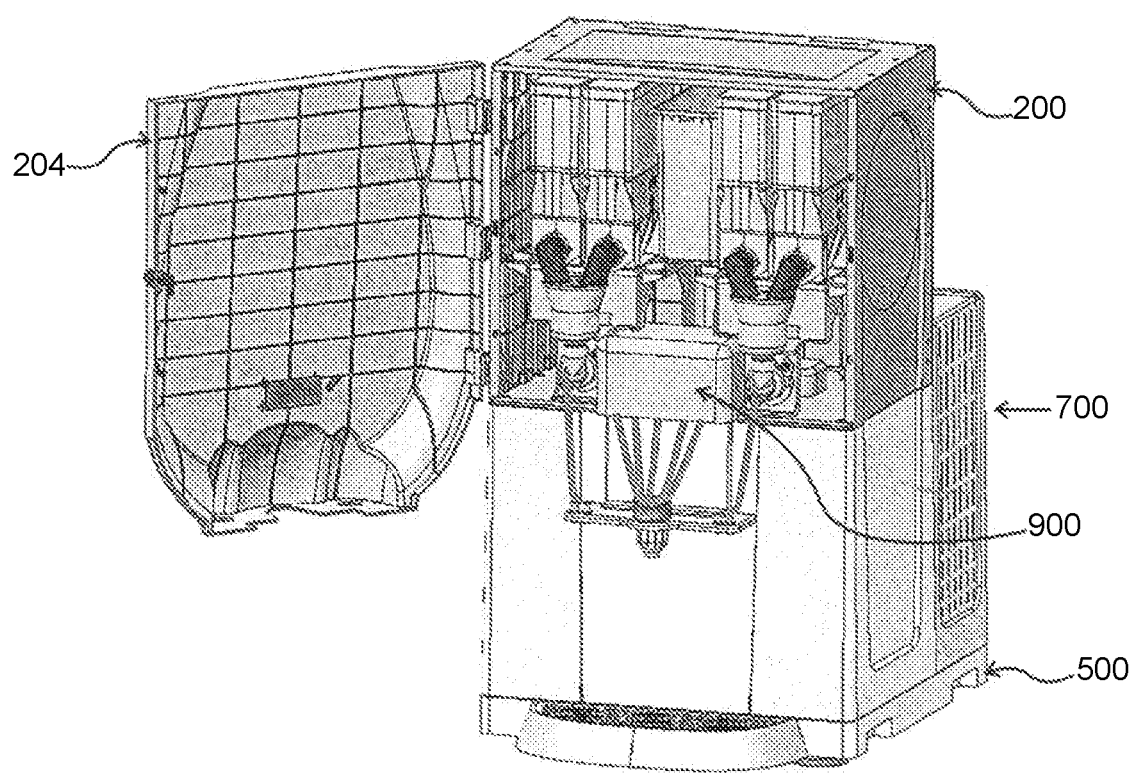
FIG. 9 illustrates the embodiment shown in FIG. 8, with a cover over mixers according to various aspects of the disclosure.

FIG. 9 shows cover 900 placed over mixers 512, 514, 516, 518, and 520, shown in FIGS. 5, 6, and 8.

Figure 10:
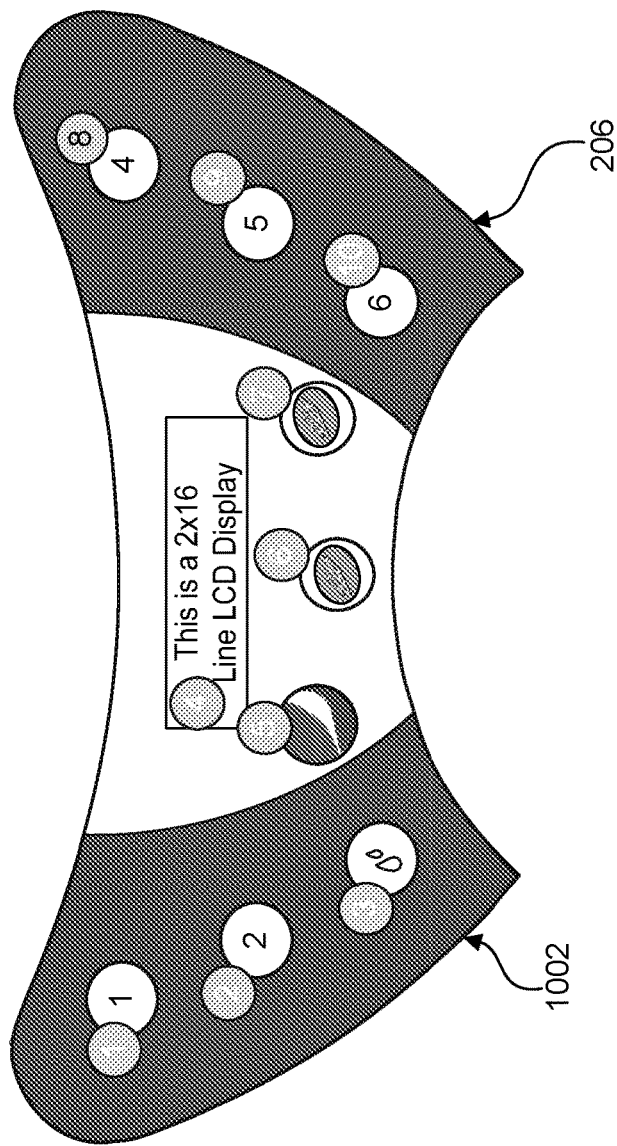
FIG. 10 illustrates a user interface according to various aspects of the disclosure.

FIG. 10 shows further detail of user interface 206 shown in FIG. 2 and in FIG. 7, along with a legend below. User interface 206 may comprise a keyboard 1002. Keyboard 1002 may comprise buttons 1, 2, 3, 5, 6, 7, 8, 9, and 10, and display screen 4. Button 1 may correspond to a first hot beverage, button 2 may correspond to a second hot beverage, and button 3 may correspond to hot water. Button 8 may correspond to a first cold beverage, button 9 may correspond to a second cold beverage, and button 10 may correspond to a third cold beverage. Button 5 may correspond to a first beverage comprising a syrup or concentrate, button 6 may correspond to a second beverage comprising a syrup or concentrate, and button 7 may correspond to a third beverage comprising a syrup or concentrate.

Figure 11:
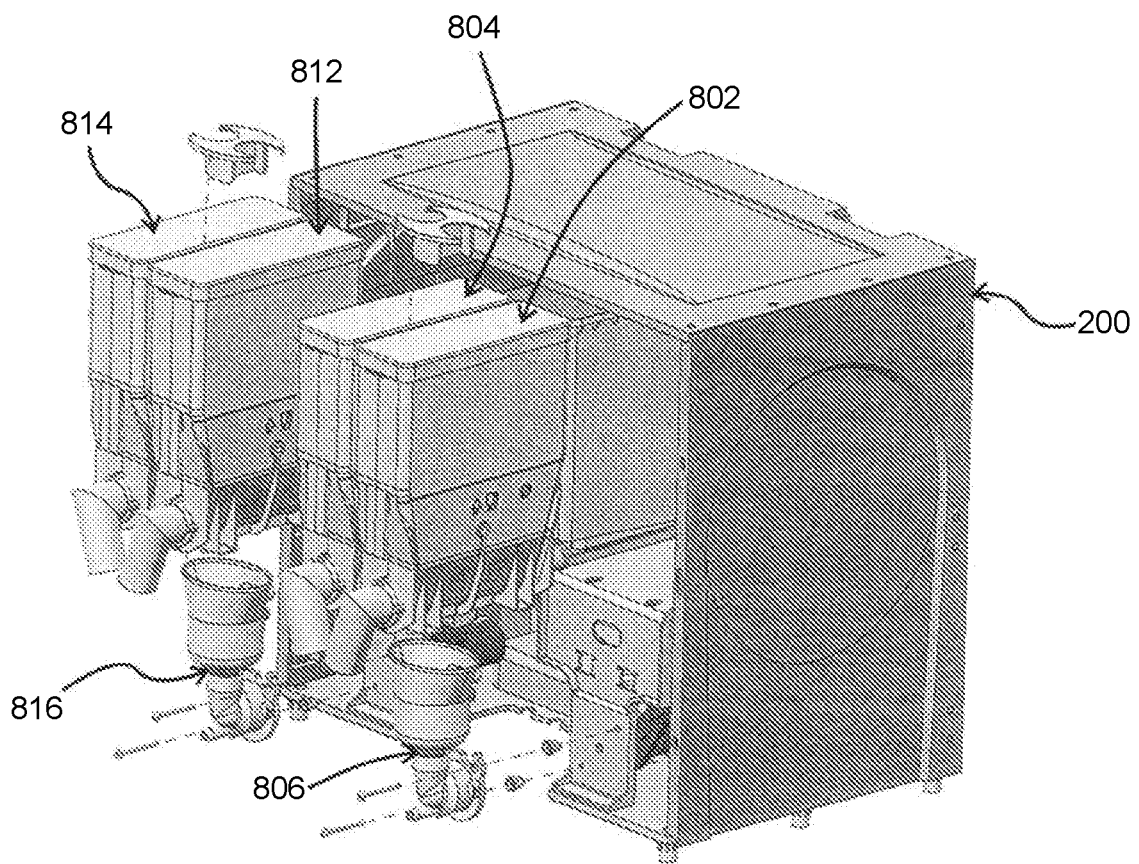
FIG. 11 illustrates a perspective exploded view showing components of assembly 200 shown in FIGS. 8 and 9 according to various aspects of the disclosure.

FIG. 11 illustrates a perspective exploded view showing components of module 200 shown in FIGS. 8 and 9 according to various aspects of the disclosure.

Figure 12:
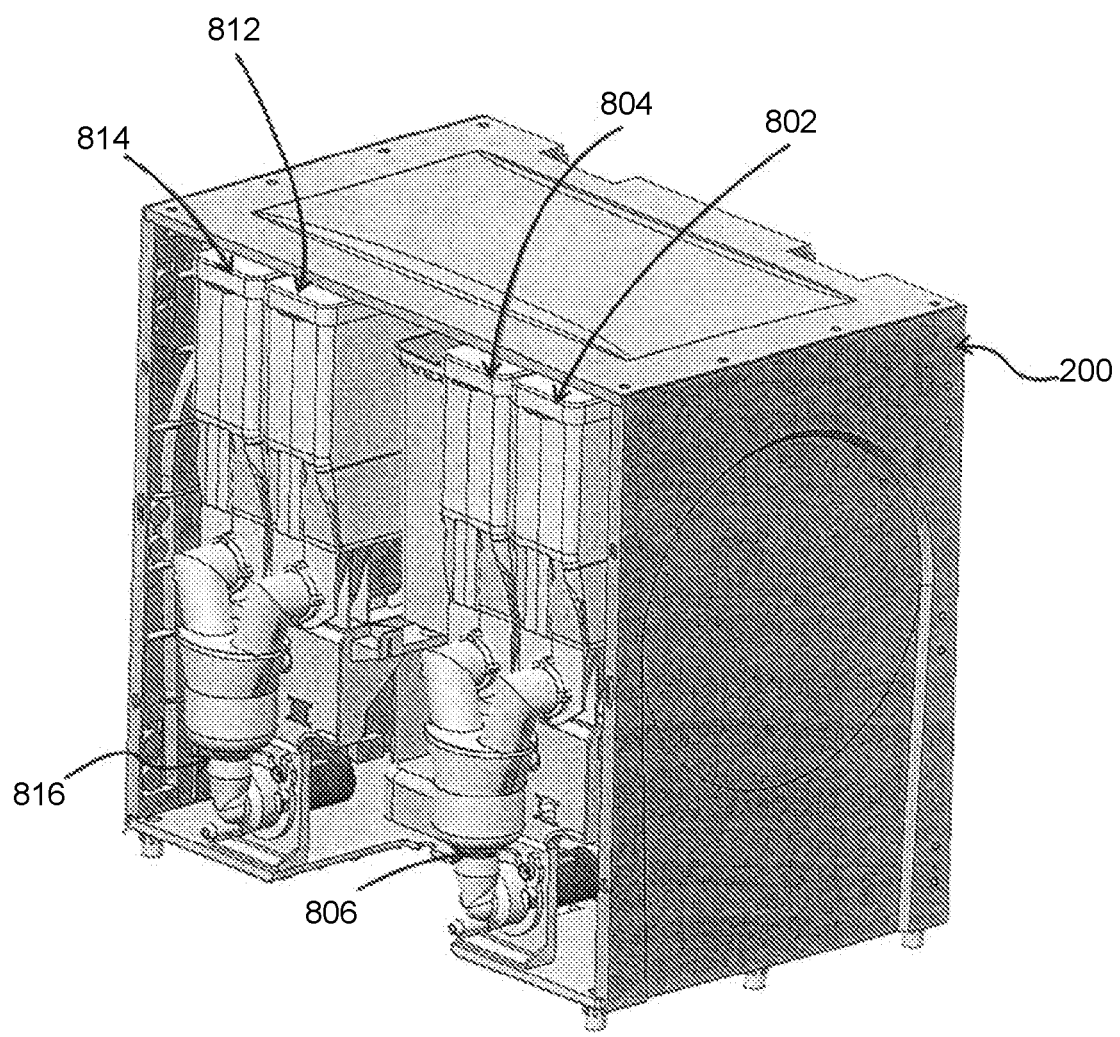
FIG. 12 illustrates the embodiment shown in FIG. 11 after assembly.

FIG. 12 illustrates the embodiment shown in FIG. 11 after assembly.

Figure 13:
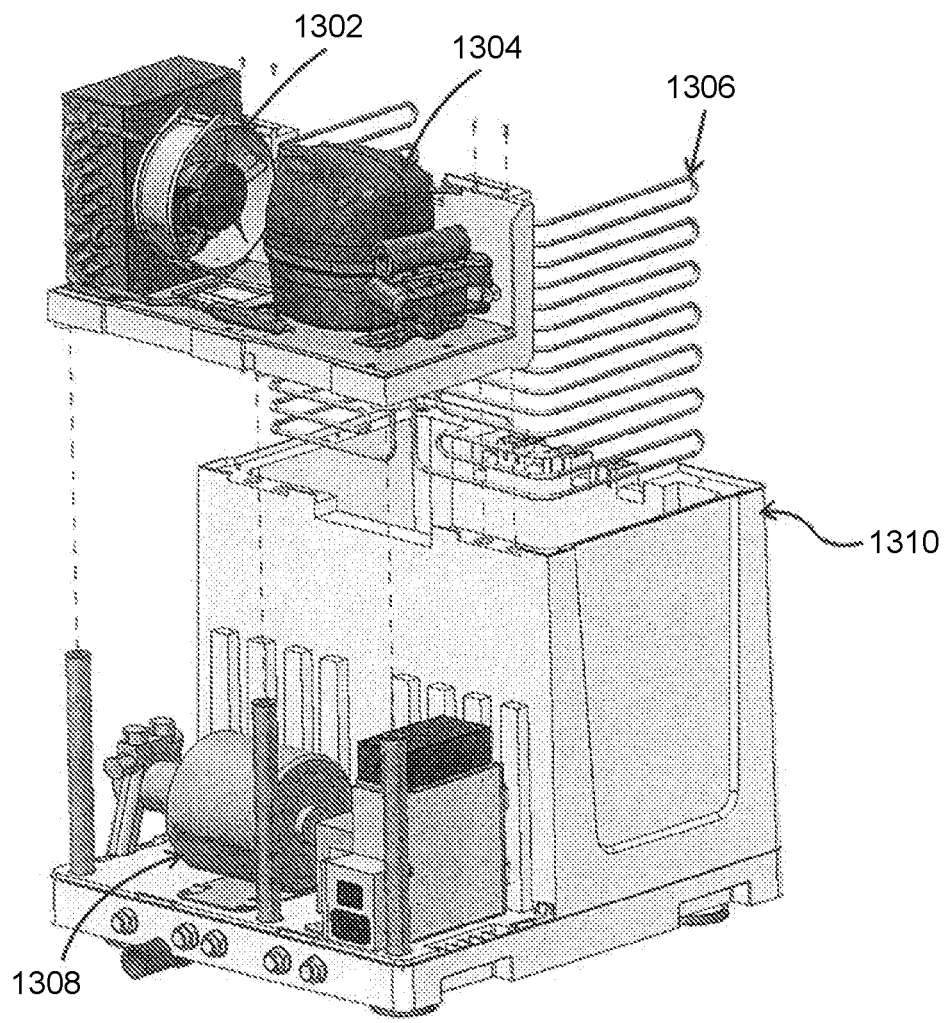
FIGS. 13 through 20 illustrate the assembly or assemblies according to various aspects of the disclosure.

FIGS. 13 through 20 illustrate the assembly of module 500 shown in FIG. 5 according to various aspects of the disclosure. FIG. 13 shows condenser fan 1302, compressor 1304, and cooling elements 1306. Also depicted is stirrer motor 1308, and cooling elements 1306. Cooling elements 1306 are configured to be placed into cold bath housing 1310.

Figure 14:
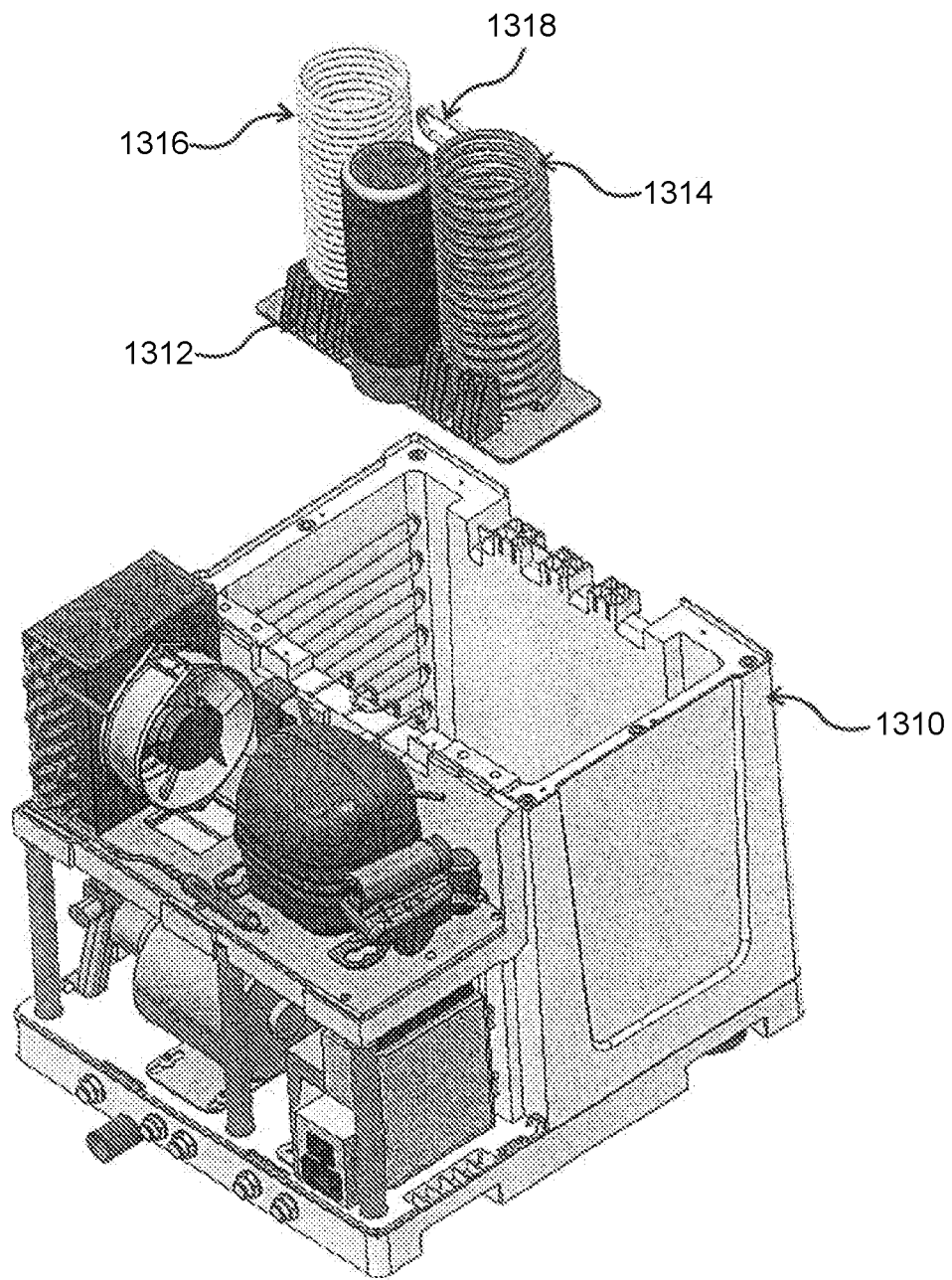

FIG. 14 depicts carbonation tank 1312, inlet water coil 1314 and outlet water coil 1316. Also shown is cooling element 1318. Inlet water coil 1314 is configured to convey water to carbonation tank 1312. Outlet water coil 1316 is configured to receive carbonated water formed in carbonation tank 1312, and convey the carbonated water to cold water mixer (not shown). Carbonation tank 1312, inlet water coil 1314 and outlet water coil 1316 are configured to be placed into cold bath housing 1310.

Figure 15:
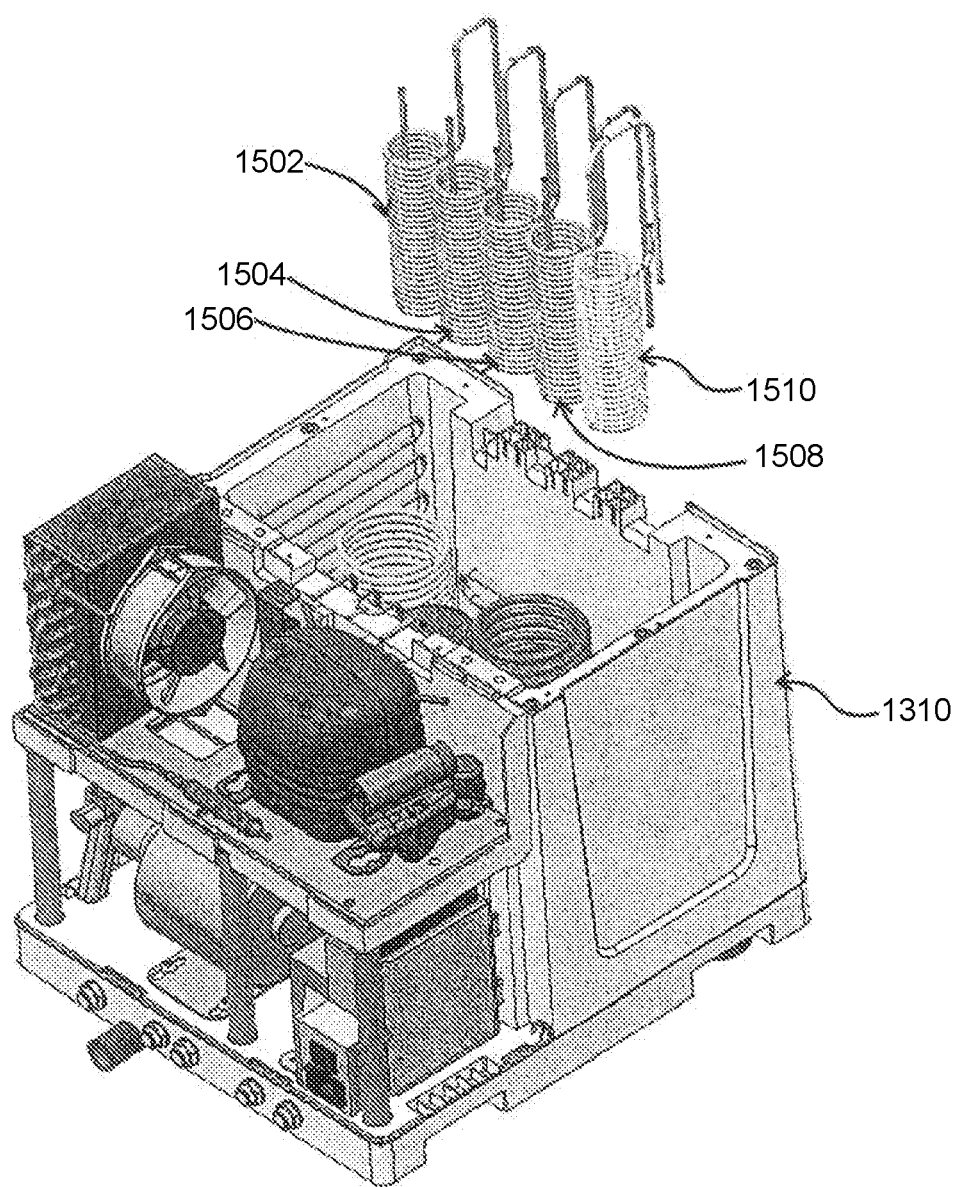

FIG. 15 shows cooling coils 1502, 1504, 1506, 1508, and 1510, each of which may be configured to convey a corresponding syrup or concentrate through the cold bath housing 1310 and to a corresponding mixer (not shown in FIG. 15).

Figure 16:
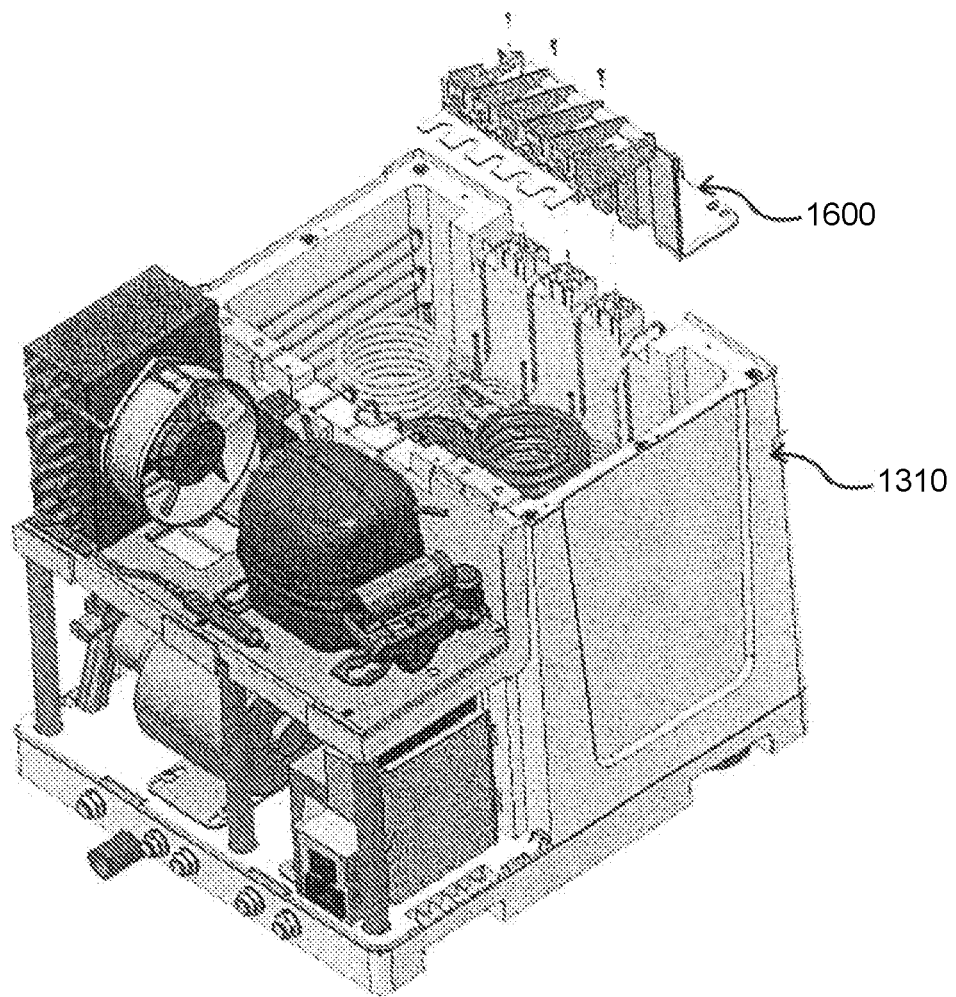
Figure 17:
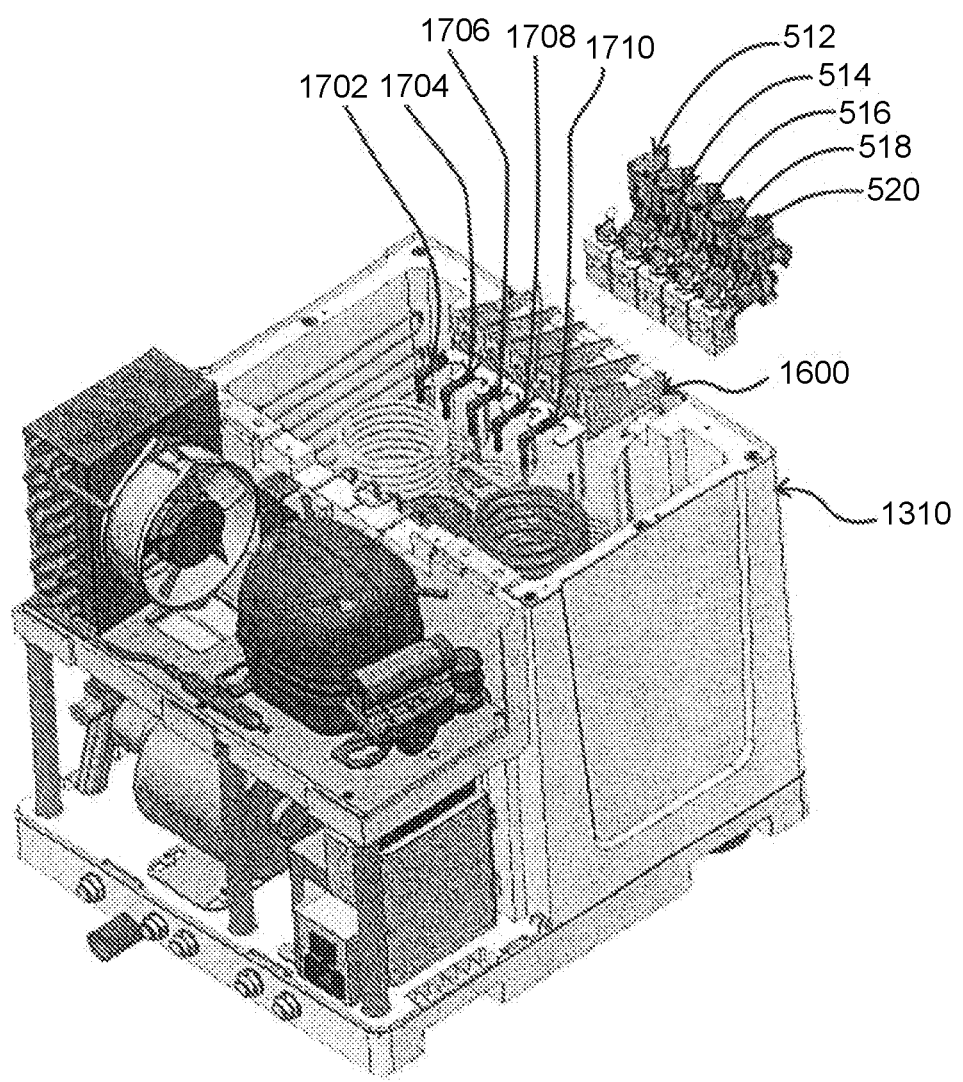
Figure 18:
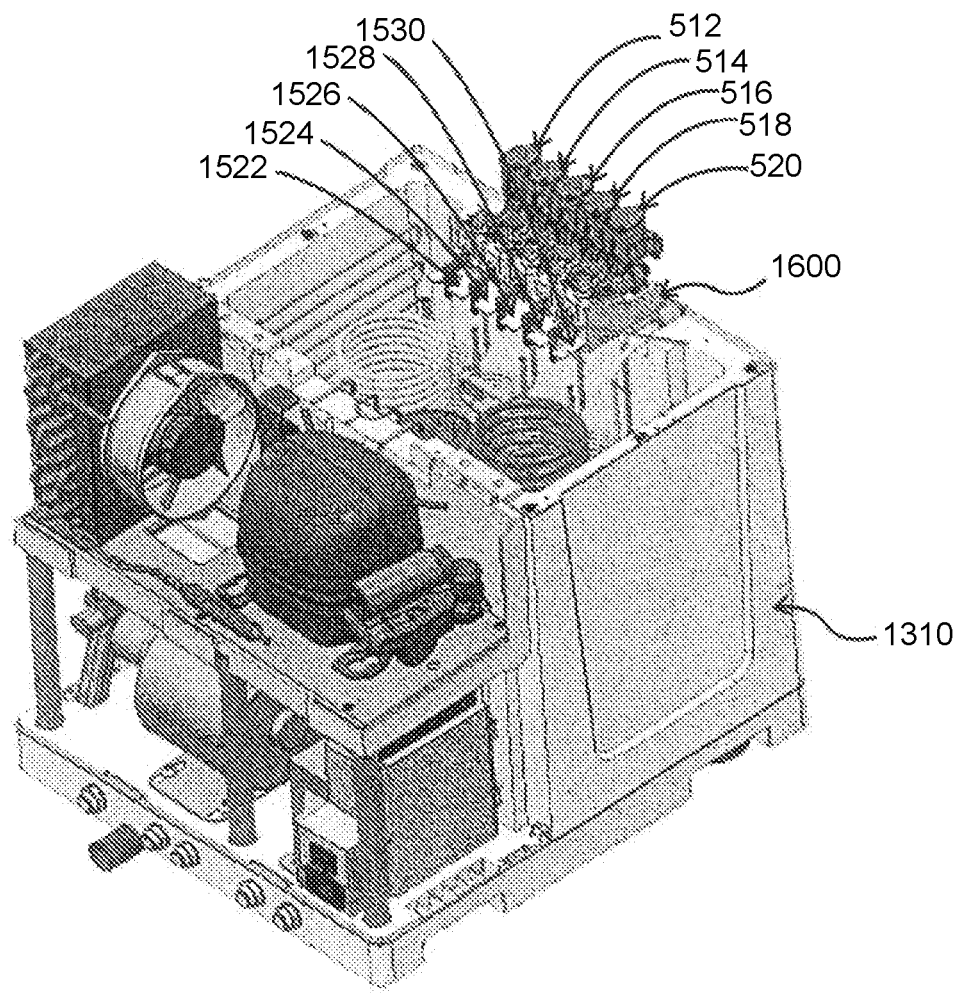
Figure 19:
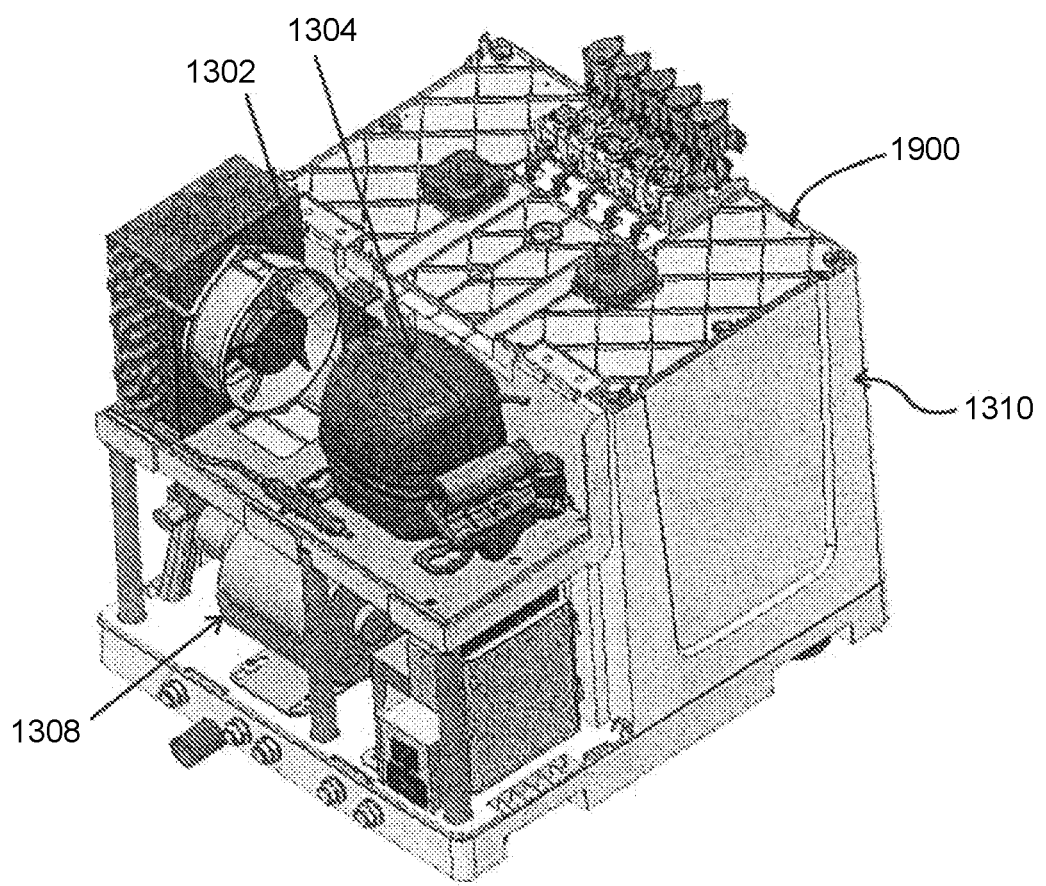
Figure 20:
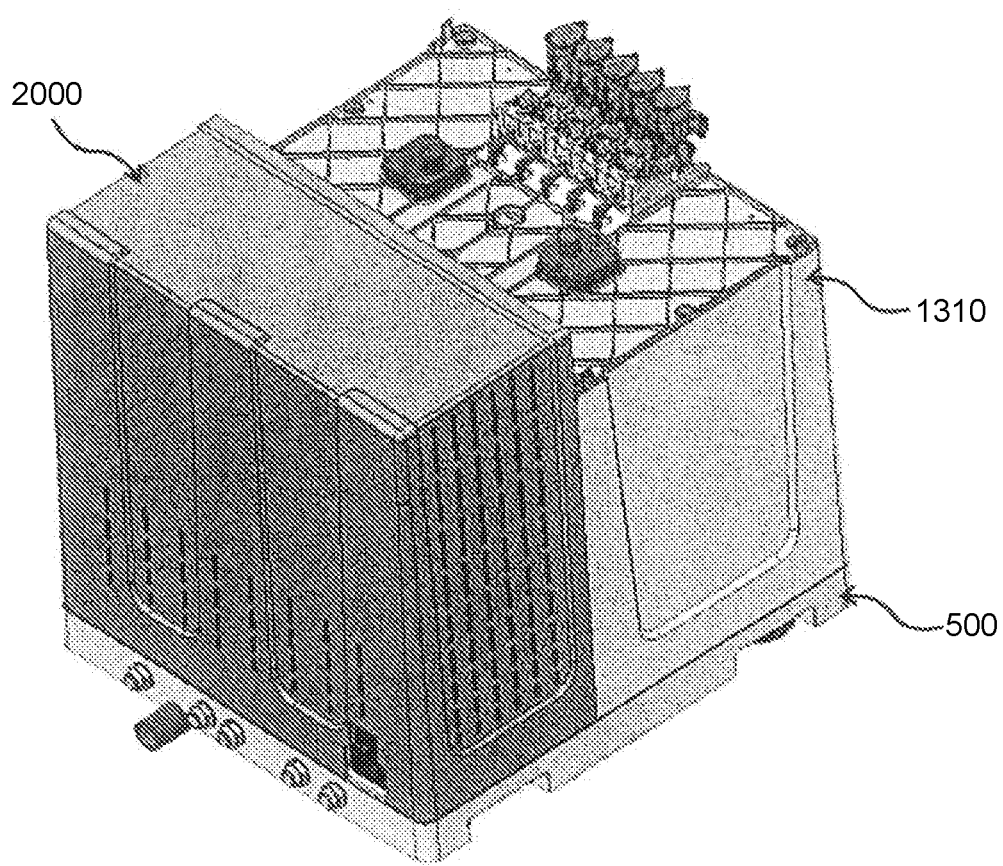

FIG. 16 shows a mixer bracket 1600 before it is placed onto cold bath housing 1310. FIG. 17 shows lines 1702, 1704, 1706, 1708 and 1710 from corresponding cooling coils 1502, 1504, 1506, 1508, and 1510 shown in FIG. 15. Cooling coils 1502, 1504, 1506, 1508, and 1510 correspond to mixers 512, 514, 516, 518 and 520, respectively. FIG. 18 shows mixers 512, 514, 516, 518 and 520 after being placed in fluid communication with outlets 1522, 1524, 1526, 1528, and 1530 of lines 1702, 1704, 1706, 1708 and 1710 from corresponding cooling coils 1502, 1504, 1506, 1508, and 1510, as shown in FIG. 17. FIG. 19 shows the embodiment shown in FIG. 18, after a top cover 1900 is placed over cold bath housing 1310. FIG. 20 shows the embodiment shown in FIG. 19 after a back cover 2000 is placed over condenser fan 1302, compressor 1304, and stirrer motor 1308 shown in FIG. 19. FIG. 20 is a rear perspective view of module 500 shown in FIG. 5.

Figure 21:
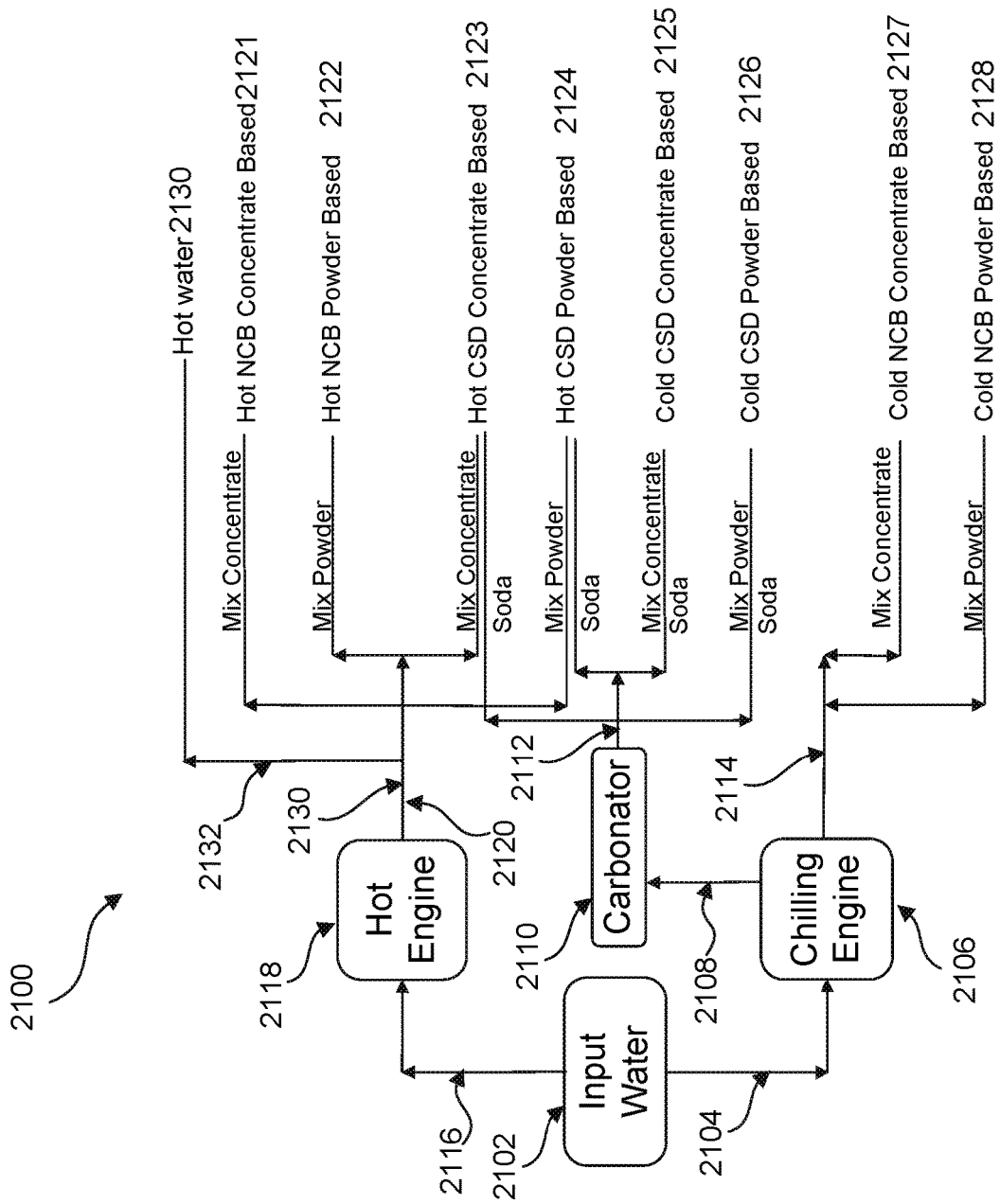
FIG. 21 illustrates a flow scheme for forming finished free flowing food products according to various aspects of the disclosure.

FIG. 21 illustrates a flow scheme 2100 for forming finished free flowing food products according to various aspects of the disclosure. Flow scheme 2100 may carried out using the same as or similar dispensing system 100 or dispensing system 700 described above. As shown in FIG. 21, input water 2102 may be conveyed through line 2104 to chilling or cold engine assembly 2106. Cold engine assembly 2106 may be the same as or similar to cold engine assembly 104 described above. Line 2108 may convey cold water from cold engine 2106 may to a carbonator 2110, such as a carbonation tank. Line 2112 may convey carbonated water formed by carbonator 2110 to mixers (not shown) for mixing with a powder or a concentrate to form a carbonated liquid. Line 2114 may convey cold water from cold engine 2106 to mixers (not shown) for mixing with a powder or a concentrate to form a non-carbonated liquid.

Input water 2102 may be conveyed through line 2116 to hot engine assembly 2118. Hot engine assembly 2118 may be the same as or similar to hot engine assembly 108 described above. Line 2120 may convey hot water 2130 to mixers (not shown) for mixing with a powder or a concentrate to form a liquid. Hot water 2130 may be the same as or similar to hot water 125 described above.

As shown in FIG. 21, various ready-to-drink liquid products may be formed in accordance with flow scheme 2100, including hot non-carbonated, concentrate based product 2121, hot non-carbonated powder based product 2122, hot carbonated soft drink concentrate based product 2123, hot carbonated soft drink powder based product 2124, cold carbonated soft drink concentrate based product 2125, cold carbonated soft drink powder based product 2126, cold non-carbonated concentrate based product 2127, and cold non-carbonated powder based product 2128.

In an aspect, hot non-carbonated concentrate based product 2121 may be formed by mixing a concentrate, e.g., one of concentrates 118, 138, 150, or 178, with hot water from hot tank 190. In an aspect, a concentrate line may be configured to convey a concentrate to mixer 123 or mixer 143, wherein the concentrate is mixed with hot water from hot tank 190. In an alternative embodiment, a concentrate line may be configured to convey a concentrate to mixer 128 or mixer 190, and a hot water line may be configured to convey hot water from tank 190 to mixer 128 or mixer 190, wherein the concentrate is mixed with hot water from hot tank 190 to form hot non-carbonated concentrate based product 2121.

In an aspect, hot carbonated soft drink concentrate based product 2123 may be formed in a similar manner as hot non-carbonated concentrate based product 2121, except that the hot water is carbonated before being mixed with a concentrate, e.g., one of concentrates 118, 138, 150, or 178. The hot water may be carbonated using carbon dioxide source 112, in either carbonator 110 or carbonating the hot water in hot tank 109.

In an aspect, hot carbonated soft drink powder based product 2124 may be formed in a similar manner as hot non-carbonated concentrate based product 2121, except that the hot water is carbonated before being mixed with a powder, e.g., one of powders 127, 133, 139 or 147. The hot water may be carbonated using carbon dioxide source 112, in either carbonator 110 or carbonating the hot water in hot tank 109.

In an aspect, cold carbonated soft drink powder based product 2126 may be formed in a similar manner as cold non-carbonated soft drink powder based product 2125, except that carbonated water is used to mix with a powder, e.g., one of powders 127, 133, 139 or 147. In an aspect, cold carbonated water may be conveyed from valve 134 to mixer 123 or mixer 143 and mixed with the powder.

Conventional dispensing systems are typically not configured to provide from a single dispensing unit or single dispensing station all of these various ready-to-drink liquid products. For example, conventional dispensing systems are typically not configured provide from a single dispensing unit or single dispensing station at least hot non-carbonated concentrate based product 2121, hot carbonated soft drink concentrate based product 2123, hot carbonated soft drink powder based product 2124, and cold carbonated soft drink powder based product 2126.

As also shown in FIG. 21, hot engine assembly 2118 may be configured to provide hot water 2130 that may be conveyed via line 2132 to a cup or container wherein the hot water is mixed with a food product, e.g., dried oatmeal or soup. Hot water 2130 may be used to sanitize equipment components similar to hot water 125 described above.

Due to the flexibility of the dispensing system described above, a multitude of ready-to-drink beverages may be provided by the dispensing system, including beverages having a desired temperature in the range of about 2 degrees Centigrade to about 95 degrees Centigrade, beverages having a desired amount of carbonation (e.g., lowering the amount of carbonation from a typical carbonated beverage by combining streams described above at the mixers described above or combining effluent streams from the mixers combined above. The dispensing system described about may be configured to convey a multitude of ready-to-drink beverages to a cup or container placed below the outlets of the mixers or nozzles described above.

Figure 22:
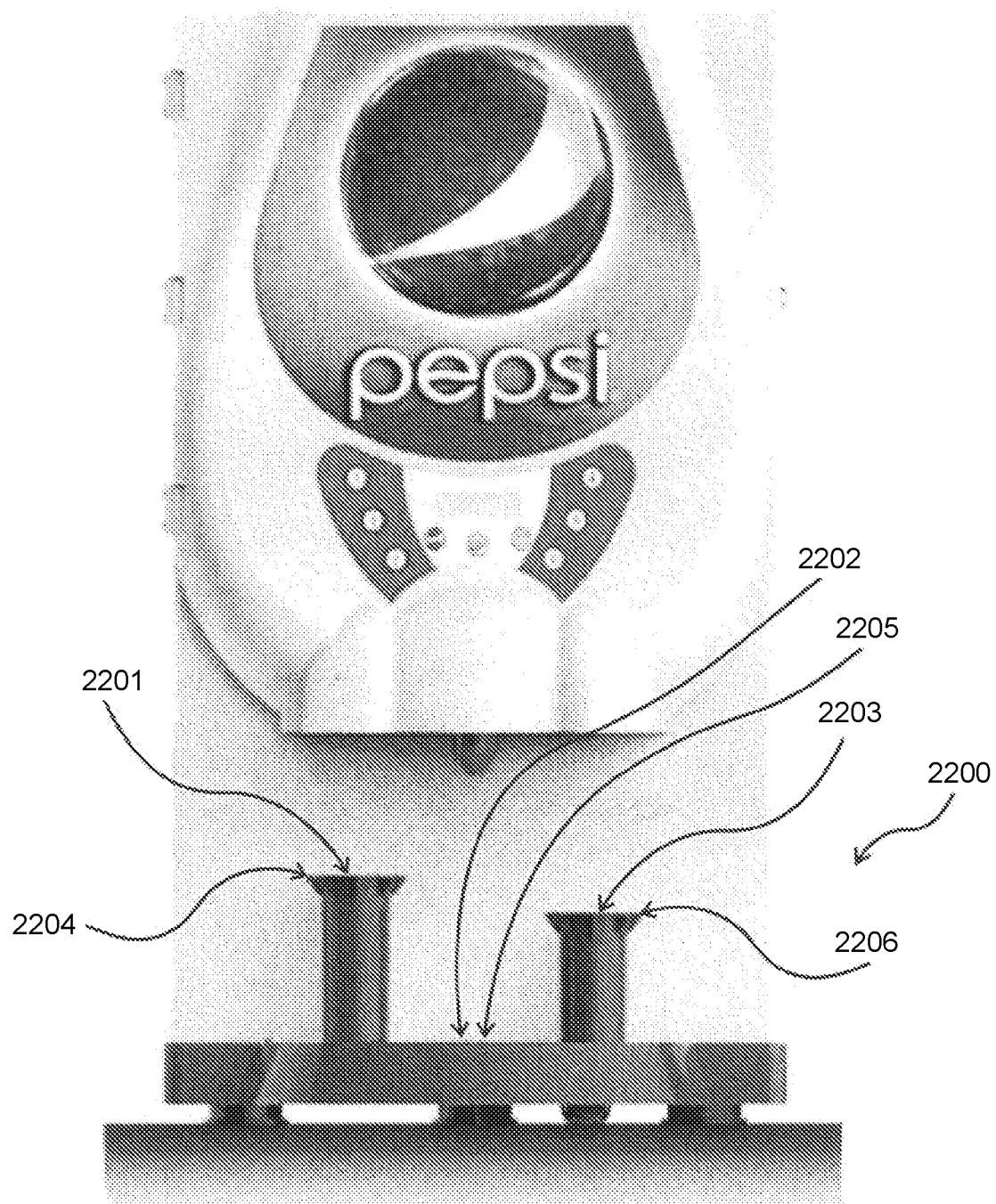
FIG. 22 illustrates a dispensing system providing dispensing locations at which a cup or container can be placed and receive one of a hot beverage, a cold beverage, or a beverage having a temperature that is between the temperature of the hot beverage and the cold beverage in accordance with aspects of the disclosure.

As shown in FIG. 22, a dispensing system 2200 may be provided having dispensing locations. Dispensing system 2200 may be the same as or similar dispensing system 100 or dispensing system 700 described above. Dispensing system 2200 may be configured to provide dispensing locations 2201, 2202, and 2203. A cup or container (not shown) may be placed at any of the dispensing locations. In an aspect, location 2201 may be a location at which a cup or container can be placed to receive a hot beverage. In an aspect, location 2202 may be a location at which a cup or container can be placed to receive a cold beverage. In an aspect, location 2203 may be a location at which a cup or container can be placed to receive a beverage having a temperature that is between the temperature of the hot beverage and the cold beverage. Locations 2201, 2202 and/or 2203 may comprise a stand or platform. Each stand or platform may have a top that has a different vertical height from the top of at least one of the other stands or platforms. As shown in FIG. 22, location 2201 comprises stand 2204, location 2202 comprises platform 2205, and location 2203 comprises stand 2206. In an aspect, location 2201 may be directly below outlet 159 described above. In an aspect, location 2202 may be directly below cold liquid mixer 128 described above. In an aspect, location 2203 may be directly below mixer 123 and/or mixer 190 described above.

In accordance with aspects of the disclosure, a modular dispensing system is provided that is configured to form a wide variety of desired ready-to-drink food products, including beverages, including carbonated or non-carbonated beverages, including hot and cold beverages at desired temperatures. The disclosed modular dispensing system may be placed at or on top of a counter to efficiently dispense products without involving multiple, separate systems that would require additional real estate or countertop space and higher operating expenses. The disclosed modular dispensing system may be used to efficiently provide desired ready-to-drink food products to meet seasonal or other changing desires of consumers.

The invention herein has been described and illustrated with reference to the embodiments of the figures, but it should be understood that the features of the invention are susceptible to modification, alteration, changes or substitution without departing significantly from the spirit of the invention. For example, the dimensions, number, size and shape of the various components may be altered to fit specific applications. Accordingly, the specific embodiments illustrated and described herein are for illustrative purposes only and the invention is not limited except by the following claims and their equivalents.

What is claimed is:

1. A modular dispensing system comprising:
a cold engine assembly;
a hot engine assembly;
a cold liquid dispensing nozzle;
a hot liquid dispensing nozzle; and
a mixer;
the cold engine assembly comprising:
 a cold bath configured to cool a liquid from an initial temperature to a desired lower temperature,
 a carbonator configured to dissolve carbon dioxide in non-carbonated water to form carbonated water,
 a cold liquid mixer,
 a concentrate line configured to convey a concentrate through the cold bath and to the cold liquid mixer, and
 a cold water line configured to convey water through the cold bath to the cold liquid mixer,
 wherein the cold liquid mixer is configured to mix the concentrate and carbonated water that has been cooled in the cold bath to form a cold carbonated concentrate based ready-to-drink liquid, and
 wherein the cold liquid dispensing nozzle is configured to dispense the cold ready-to-drink liquid;
the hot engine assembly comprising:
 a hot tank configured to heat water from an initial temperature to a desired elevated temperature,
 a hot liquid mixer, and
 a powder line configured to convey a powder to the hot liquid mixer,
 wherein the hot liquid mixer is configured to mix the powder and the water from the hot tank having the desired elevated temperature to form a hot non-carbonated powder based ready-to-drink liquid, and
 wherein the hot liquid dispensing nozzle is configured to dispense the hot ready-to-drink liquid,
wherein the mixer is fluidly connected to a source of cold water from the cold water bath and a source of hot water from the hot tank and is configured to mix hot water and cold water together to form water at a temperature between that of the hot water and the cold water entering the mixer, and
wherein the cold engine assembly and the hot engine assembly form a single dispensing unit having a single dispensing station, the single dispensing station comprising the cold liquid dispensing nozzle and the hot liquid dispensing nozzle.

2. The modular dispensing system of claim 1, wherein the cold bath is configured to cool a liquid to a temperature in the range of about 2 to 4 degrees Centigrade.

3. The modular dispensing system of claim 1, wherein the hot tank is configured to heat water to a temperature in the range of about 80 to 95 degrees Centigrade.

4. The modular dispensing system of claim 1, wherein the hot liquid dispensing outlet is at substantially the same height as the cold drink dispensing nozzle.

5. The modular dispensing system of claim 1, wherein the concentrate comprises at least a first concentrate and a second concentrate,
wherein the concentrate line comprises a first concentrate line and second concentrate line, the first concentrate line configured to convey the first concentrate through the cold bath and to the cold liquid mixer, the second concentrate line configured to convey the second concentrate through the cold bath and to the cold liquid mixer, the cold liquid mixer configured to mix the first concentrate and carbonated water that has been cooled in the cold bath to form a first cold carbonated concentrate based ready-to-drink liquid, the cold liquid mixer configured to mix the second concentrate and carbonated water that has been cooled in the cold bath to form a second cold carbonated concentrate based ready-to-drink liquid.

6. The modular dispensing system of claim 5, wherein the cold liquid mixer comprises a first cold liquid mixer and a second cold liquid mixer;
wherein the first cold liquid mixer is configured to either mix the first concentrate and the carbonated water to form the first cold carbonated concentrate based ready-to-drink liquid, or mix the second concentrate and the carbonated water to form the second cold carbonated concentrate based ready-to-drink liquid;
wherein the concentrate comprises a third concentrate, wherein the concentrate line comprises a third concentrate line, the third concentrate line configured to convey the third concentrate through the cold bath and to the second cold liquid mixer, the second cold liquid mixer configured to mix the third concentrate and water that has been cooled in the cold bath, but is not carbonated, to form a cold non-carbonated concentrate based ready-to-drink liquid.

7. The modular dispensing system of claim 5, wherein the powder comprises at least a first powder and a second powder,
wherein the powder line comprises a first powder line and second powder line, the first powder line configured to convey the first powder to the hot liquid mixer, the second powder line configured to convey the second powder to the hot liquid mixer;
wherein the hot liquid mixer is configured to either mix the first powder and the hot water to form the first hot powder based ready-to-drink liquid, or mix the second powder and the hot water to form the second hot powder based ready-to-drink liquid.

8. The modular dispensing system of claim 7, wherein the powder further comprises at least a third powder, wherein the powder line comprises at least a third powder line,
wherein the third powder line is configured to convey the third powder to a multi-temperature mixer, the multi-temperature mixer configured to either mix hot water from the hot tank and the third powder to form a third hot powder based ready-to-drink liquid, or to mix cold water from the cold bath and the third powder to form a first cold powder based ready-to-drink liquid.

9. The modular dispensing system of claim 8, wherein the powder further comprises a fourth powder, wherein the powder line comprises a fourth powder line,
wherein the fourth powder line is configured to convey the fourth powder to the multi-temperature mixer, the multi-temperature mixer configured to either mix hot water from the hot tank and the fourth powder to form a fourth hot powder based ready-to-drink liquid, or to mix cold water from the cold bath and the fourth powder to form a second cold powder based ready-to-drink liquid.

10. The modular dispensing system of claim 9, wherein the concentrate further comprises a fourth concentrate, wherein the concentrate line comprises a fourth concentrate line, the fourth concentrate line configured to convey the fourth concentrate through the cold bath and to the first cold liquid mixer, the first cold liquid mixer configured to mix the fourth concentrate and water that has been cooled in the cold bath and has been carbonated, to form a cold carbonated concentrate based ready-to-drink liquid that based on the fourth concentrate.

11. The modular dispensing system of claim 1, wherein the hot engine assembly is configured to convey hot water from the hot tank through the hot liquid dispensing outlet without being mixed with a concentrate or powder.

12. The modular dispensing system of claim 1, wherein the cold engine assembly is configured to form a cold non-carbonated beverage that is concentrate based.

13. The modular dispensing system of claim 1, wherein the cold engine assembly is configured to form a cold non-carbonated beverage that is powder based.

14. The modular dispensing system of claim 1, wherein the cold engine assembly is configured to form a cold carbonated beverage that is powder based.

15. The modular dispensing system of claim 1, wherein the hot engine assembly is configured to form a hot non-carbonated beverage that is concentrate based.

16. The modular dispensing system of claim 1, wherein the hot engine assembly is configured to form a hot carbonated beverage that is concentrate based.

17. The modular dispensing system of claim 1, wherein the hot engine assembly is configured to form a hot carbonated beverage that is powder based.

18. The modular dispensing system of claim 1, wherein the modular dispensing system is located at a counter.

19. The modular dispensing system as claimed in claim 1, wherein the modular dispensing system is configured to use hot water from the hot tank to sanitize at least one of a concentrate line, a pump, or a mixer.

20. The modular dispensing system as claimed in claim 19, further comprising a sanitizing line that fluidly connects the hot tank to at least one component of the cold engine assembly, wherein the modular dispensing system is configured to sanitize the at least one component of the cold engine assembly by pumping hot water from the hot tank through the sanitizing line.

21. The modular dispensing system as claimed in claim 1, wherein the cold engine assembly comprises a first coil and a second coil disposed in the cool bath configured to cool water, wherein the first coil is fluidly connected to the carbonator, and wherein the second coil is fluidly connected to at least one mixer outside of the cool bath and is not connected to the carbonator.

* * * * *